United States Patent
Mishra

(10) Patent No.: US 10,531,356 B2
(45) Date of Patent: Jan. 7, 2020

(54) VOIP AND NATIVE CARRIER CALL INTEGRATION

(71) Applicant: Parallel Wireless, Inc., Nashua, NH (US)

(72) Inventor: Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/706,663

(22) Filed: Sep. 15, 2017

(65) Prior Publication Data

US 2018/0049095 A1 Feb. 15, 2018

Related U.S. Application Data

(63) Continuation-in-part of application No. 15/678,104, filed on Aug. 15, 2017, now Pat. No. 10,237,914.

(Continued)

(51) Int. Cl.
*H04W 40/02* (2009.01)
*H04W 4/16* (2009.01)
(Continued)

(52) U.S. Cl.
CPC ............ *H04W 40/02* (2013.01); *H04W 4/16* (2013.01); *H04W 4/18* (2013.01); *H04W 88/16* (2013.01)

(58) Field of Classification Search
CPC ....... H04W 40/02; H04W 4/16; H04W 88/16; H04W 84/045; H04W 84/18;
(Continued)

(56) References Cited

U.S. PATENT DOCUMENTS 7,437,162 B1 * 10/2008 Zhang ................. H04Q 3/0045
370/310
8,139,541 B2 3/2012 Ejzak et al.
(Continued)

FOREIGN PATENT DOCUMENTS

EP          1560378 B1   11/2012
WO     2013025554 A1    2/2013
(Continued)

OTHER PUBLICATIONS

Justin MA, WCDMA HO Call Flows, Jun. 2014, available at https://www.slideshare.net/JaChangMa/wcdma-hocallflowv2014-0625.

(Continued)

*Primary Examiner* — Kashif Siddiqui
(74) *Attorney, Agent, or Firm* — Michael Y. Saji; David W. Rouille

(57) ABSTRACT

A method for native call and VoIP call integration is disclosed, comprising: receiving, at a switch in a mobile operator network, an incoming call for a mobile device; querying a convergence gateway from the soft switch via an application programming interface (API) at the convergence gateway to determine whether the mobile device is currently engaged in a voice over IP (VoIP) call using a VoIP calling software application on the mobile device; delivering the incoming call via the soft switch over IP as a VoIP call to the VoIP calling software application on the mobile device.

13 Claims, 14 Drawing Sheets

Related U.S. Application Data

(60) Provisional application No. 62/395,354, filed on Sep. 15, 2016, provisional application No. 62/375,341, filed on Aug. 15, 2016.

(51) Int. Cl.
*H04W 4/18* (2009.01)
*H04W 88/16* (2009.01)

(58) Field of Classification Search
CPC ... H04W 88/10; H04W 88/14; H04W 88/182; H04W 92/045; H04W 92/06; H04W 92/14
See application file for complete search history.

(56) References Cited

U.S. PATENT DOCUMENTS

| | | |
|---|---|---|
| 8,787,331 B2 | 7/2014 | Liu et al. |
| 8,824,430 B2 | 9/2014 | Ioannidis |
| 8,855,058 B2 | 10/2014 | Lim et al. |
| 8,887,070 B1 | 11/2014 | Hecht et al. |
| 9,078,078 B1 | 7/2015 | Fine |
| 9,185,543 B2 | 11/2015 | Liu et al. |
| 9,198,021 B2 | 11/2015 | Tomici et al. |
| 9,241,292 B2 | 1/2016 | Jain |
| 9,591,031 B2 | 3/2017 | Cartmell et al. |
| 9,742,535 B2 | 8/2017 | Hernando |
| 2004/0082328 A1 | 4/2004 | Japenga et al. |
| 2005/0282572 A1 | 12/2005 | Wigard et al. |
| 2006/0111112 A1* | 5/2006 | Maveddat ............. H04W 8/02 455/439 |
| 2008/0002669 A1 | 1/2008 | O'Brien et al. |
| 2008/0056236 A1* | 3/2008 | Barclay ............... H04W 4/16 370/352 |
| 2008/0090570 A1* | 4/2008 | Deshpande .......... H04M 7/123 455/436 |
| 2008/0207269 A1 | 8/2008 | Byrne et al. |
| 2009/0213760 A1 | 8/2009 | Shin et al. |
| 2010/0130205 A1 | 5/2010 | Jung et al. |
| 2010/0329244 A1 | 12/2010 | Buckley et al. |
| 2011/0267943 A1 | 11/2011 | Huang et al. |
| 2012/0052866 A1 | 3/2012 | Froehlich et al. |
| 2012/0082073 A1 | 4/2012 | Andreasen et al. |
| 2012/0120831 A1 | 5/2012 | Gonsa et al. |
| 2012/0257598 A1 | 10/2012 | Karampatis et al. |
| 2013/0003697 A1 | 1/2013 | Kdjakple et al. |
| 2013/0095862 A1 | 4/2013 | Bejerano et al. |
| 2013/0121206 A1 | 5/2013 | Turányi et al. |
| 2013/0143563 A1 | 6/2013 | Singh et al. |
| 2013/0329567 A1 | 12/2013 | Mathias et al. |
| 2014/0050208 A1 | 2/2014 | Annaluru et al. |
| 2014/0064156 A1 | 3/2014 | Paladugu et al. |
| 2014/0223538 A1 | 8/2014 | Van De Velde et al. |
| 2014/0269269 A1 | 9/2014 | Kovvali et al. |
| 2014/0286308 A1 | 9/2014 | Lee et al. |
| 2014/0293959 A1 | 10/2014 | Singh et al. |
| 2014/0341109 A1 | 11/2014 | Cartmell et al. |
| 2015/0003420 A1 | 1/2015 | Vangala et al. |
| 2015/0009826 A1 | 1/2015 | Ma et al. |
| 2015/0063295 A1 | 3/2015 | Himayat et al. |
| 2015/0063346 A1 | 3/2015 | Eswara et al. |
| 2015/0098394 A1 | 4/2015 | Corcoran et al. |
| 2015/0257051 A1 | 9/2015 | Rao et al. |
| 2015/0359020 A1 | 12/2015 | Reynaud et al. |
| 2016/0037432 A1 | 2/2016 | Lin et al. |
| 2016/0080431 A1 | 3/2016 | Reddy et al. |
| 2016/0373987 A1 | 12/2016 | Ahmad et al. |
| 2017/0055238 A1 | 2/2017 | Grayson et al. |

FOREIGN PATENT DOCUMENTS

| | | |
|---|---|---|
| WO | 2014207712 A1 | 12/2014 |
| WO | 2016083524 A1 | 6/2016 |
| WO | 2018104769 A1 | 6/2018 |

OTHER PUBLICATIONS

Schulzrinne, H., Casner, S., Frederick, R., Jacobson, V., "RIP: A Transport Protocol for Real-Time Applications," Network Working Group, RFC 1889, Jan. 1996, retrieved from https://tools.ietf.org/pdf/rfc1889.pdf.

3rd Generation Partnership Project, 3GPP TS 25.304 V10.0.0 (Mar. 2011), "3rd Generation Partnership Project; Technical Specification Group Radio Access Network; User Equipment (UE) Procedures in Idle Mode and Procedures for Cell Reselection in Connected Mode (Release 10)," Mar. 2011, V10.0.0.

Loughney, J., Sidebottom, G., Coene, L., Verwimp, G., Keller, J., Bidulock, B., "Signaling Connection Control Part User Adaption Layer (SUA)," Network Working Group, RFC 3868, Oct. 2004, retrieved from https://tools.ietf.org/pdf/rfc3868.pdf.

3rd Generation Partnership Project, 3GPP TR 29.903 V6.0.0 (Dec. 2004), "3rd Generation Partnership Project; Technical Specification Group Core Networks; Feasibility Study on SS7 signaling transport in the core network with SCCP-User Adaption (SUA) layer (Release 6)," Dec. 2004, V6.0.0.

"SIP Number Portability Parameters," VoIP Info, Dec. 20, 2010, retrieved from https://www.voip-info.org/wiki/view/S1P+Number+Portability+Parameters.

Rosenberg, J., Schulzrinne, H., Camarillo, G., Johnston, A., Peterson, J., Sparks, R., Handley, M., Schooler, E., "SIP: Session Initiation Protocol," Network Working Group, RFC 3261, Jun. 2002, retrieved from https://www.ietf.org/rfc/rfc3261.txt.

Zahid Ghadialy, "CAMEL: An Introduction," 3G4G.CO.UK, Jul. 25, 2004, retrieved from http://www.3g4g.co.uk/Tutorial/ZG/zg_camel.html.

Michael Finneran, "Apple Reinvents Mobile UC," No Jitter, Jun. 14, 2016, retrieved from http://www.nojitter.com/post/240171745/apple-reinvents-mobile-uc.

PCT International Search Report for PCT/US17/47038, dated Mar. 6, 2018.

* cited by examiner

VOIP AND NATIVE CARRIER CALL INTEGRATION

CROSS-REFERENCE TO RELATED APPLICATIONS

This application is a continuation-in-part of, and claims priority under 35 U.S.C. § 120 to, U.S. patent application Ser. No. 15/678,104, titled "S2 Proxy for Multi-Architecture Virtualization" and filed on Aug. 15, 2017, itself a non-provisional conversion of U.S. Provisional Pat. App. No. 62/375,341, each hereby incorporated by reference in its entirety for all purposes; and is also a non-provisional conversion of, and claims priority under 35 U.S.C. § 119(e) to, U.S. Provisional Pat. App. No. 62/395,354, titled "VoIP and Native Carrier Call Integration" and filed on Sep. 15, 2016, also hereby incorporated by reference in its entirety for all purposes.

The present application also hereby incorporates by reference for all purposes U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. patent application Ser. No. 15/464,333, "IuGW Architecture," filed Mar. 20, 2017; U.S. patent application Ser. No. 14/642,544, "Federated X2 Gateway," filed on Mar. 9, 2015; U.S. patent application Ser. No. 14/936,267, "Self-Calibrating and Self-Adjusting Network," filed on Nov. 9, 2015; U.S. patent application Ser. No. 14/806,594, "Signaling Storm Reduction from Radio Networks," filed Jul. 22, 2015; U.S. patent application Ser. No. 14/822,839, "Congestion and Overload Reduction," filed Aug. 10, 2015; and U.S. Pat. App. No. 61/724,312, "Method of optimizing Paging over LTE radio," filed Nov. 9, 2012. In addition, IETF RFC 3261, "SIP: Session Initiation Protocol," dated 2002, is also hereby incorporated by reference in its entirety for all purposes.

BACKGROUND

In many environments, it is important to support voice calling, including in networks where Long Term Evolution (LTE) is deployed. However, LTE does not support voice calling over legacy networks, instead providing voice capability via its own standard, Voice over LTE (VoLTE). There is consequently a need for compatibility with legacy voice calling, including circuit-switched (CS) voice calling, that is currently met imperfectly, typically by providing both a 2G/3G core network and a parallel LTE core network. As both networks have cumulative maintenance and operational expense (opex) requirements, the new network is significantly more expensive.

As well, with the requirement that wireless operators support all generations of radio technologies, and the expense of maintaining 2G, 3G, 4G and upcoming 5G infrastructures, operators have desired to transition their core infrastructure to remove legacy components and converge to a single IP core. This will help them move to all IP, an all-virtualized core network infrastructure and reduce not only capital expenditures (capex) but also operational expenditures (opex) significantly.

SUMMARY

Systems and methods are disclosed for a network convergence gateway providing VoIP and native call integration.

In one embodiment, a method is disclosed, comprising: receiving, at a switch in a mobile operator network, an incoming call for a mobile device; querying a convergence gateway from the soft switch via an application programming interface (API) at the convergence gateway to determine whether the mobile device is currently engaged in a voice over IP (VoIP) call using a VoIP calling software application on the mobile device; delivering the incoming call via the soft switch over IP as a VoIP call to the VoIP calling software application on the mobile device.

The method may further comprise providing call waiting, call hold, call swap, or call joining at the mobile device using the VoIP calling software application. The method may further comprise delivering a second incoming call via a mobile operator network as a native call to the mobile device, and providing call waiting, call hold, call swap, or call joining at the mobile device using operator network-assisted native call functions. The method may further comprise performing evaluation of the incoming call using a number portability database to determine whether the incoming call is able to be rerouted to a soft switch; and routing the incoming call to the soft switch. The convergence gateway may be situated in an operator network as a gateway between a plurality of base stations and a network switching subsystem in a 2G, 3G, or 4G LTE network. The API may be enabled to be accessed by the VoIP calling software application on the mobile device for handling VoIP calls and for determining a current call state of the mobile device. The API may be enabled to be accessed by an operator core network for handling native calls and for determining a current call state of the mobile device.

In another embodiment, a non-transitory computer-readable medium is disclosed, comprising instructions which, when executed on a processor at a gateway, cause the gateway to perform steps comprising: receiving a request to deliver an incoming call; determining whether a mobile device is currently engaged on a Voice over IP (VoIP) call using a VoIP application on the mobile device; delivering the incoming call via a mobile switching station in a mobile operator network as a native telephone call to the mobile device, if the mobile device is not currently engaged on a VoIP call; delivering the incoming call as a second VoIP call via the VoIP application, if the mobile device is currently engaged on a VoIP call.

The steps may further comprise providing call waiting, call hold, call swap, or call joining at the mobile device using the VoIP calling software application. The steps may further comprise delivering a second incoming call via a mobile operator network as a native call to the mobile device, and providing call waiting, call hold, call swap, or call joining at the mobile device using operator network-assisted native call functions. The steps may further comprise performing evaluation of the incoming call using a number portability database to determine whether the incoming call is able to be rerouted to a soft switch; and routing the incoming call to the soft switch. The convergence gateway may be situated in an operator network as a gateway between a plurality of base stations and a network switching subsystem in a 2G, 3G, or 4G LTE network. The API may be enabled to be accessed by the VoIP calling software application on the mobile device for handling VoIP calls and for determining a current call state of the mobile device. The API may be enabled to be accessed by an operator core network for handling native calls and for determining a current call state of the mobile device.

DETAILED DESCRIPTION

Figure 1:
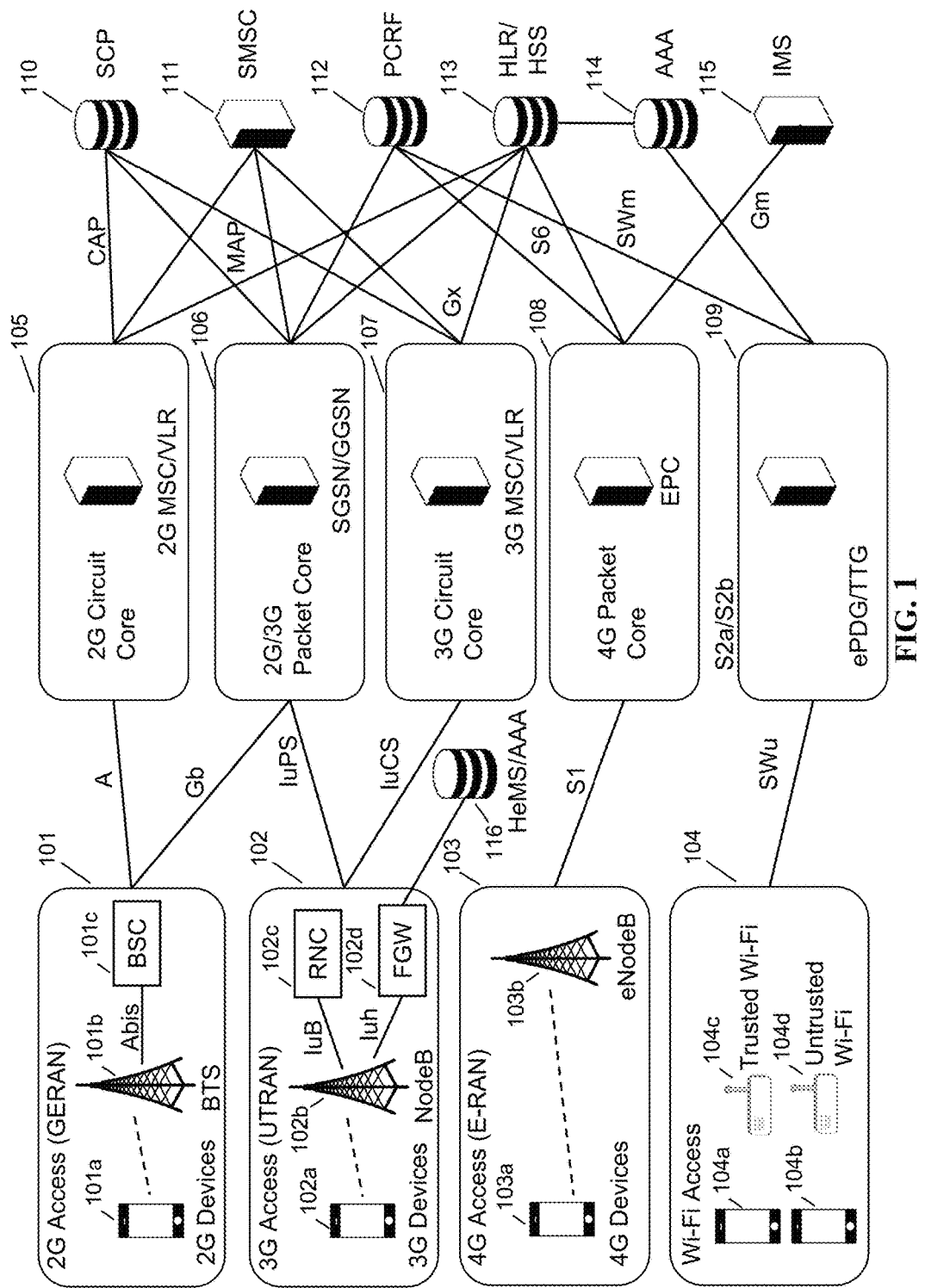
FIG. 1 depicts a prior art core network architecture.
Figure 2:
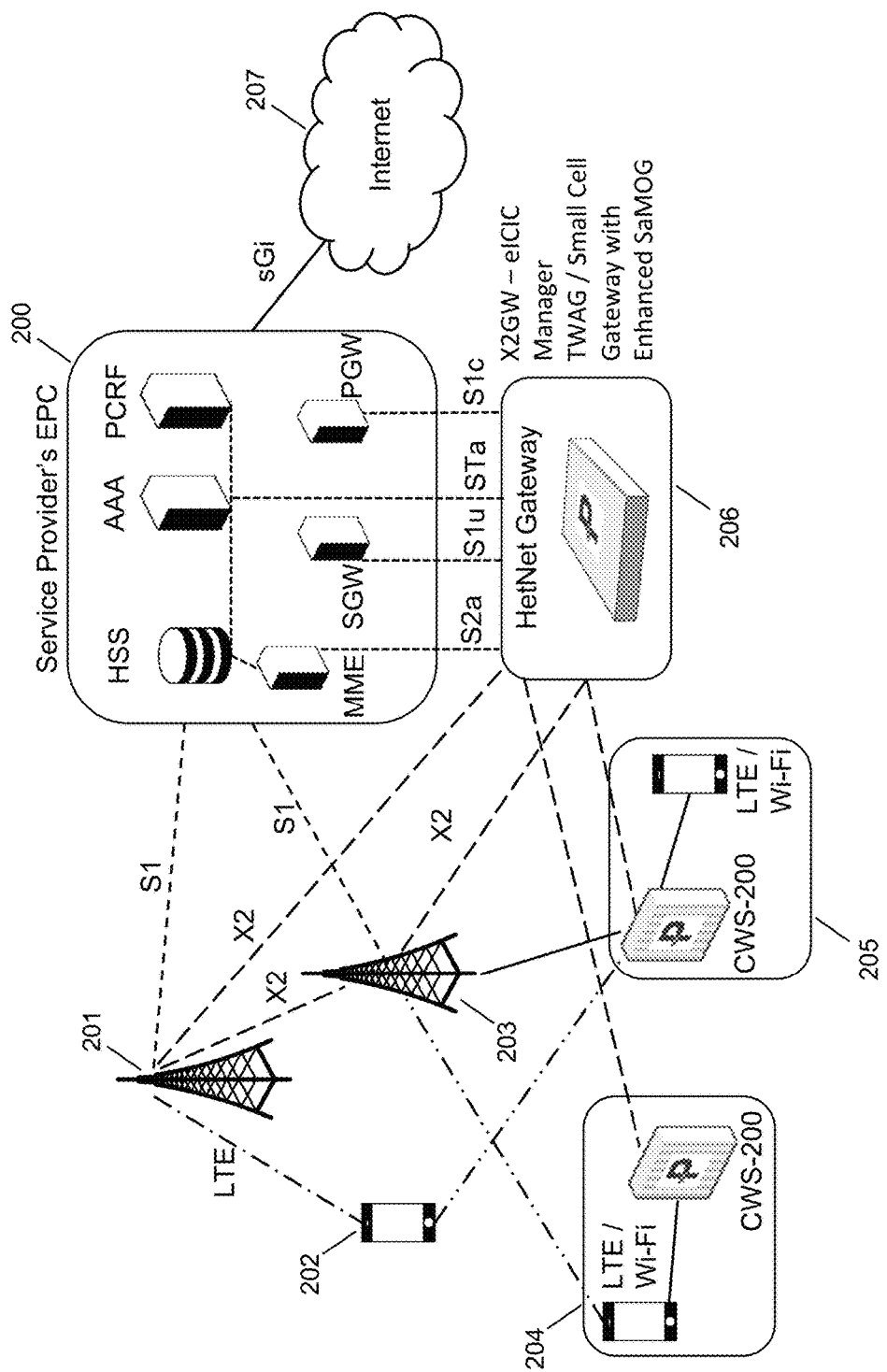
FIG. 2 is a network architecture diagram showing integration of Wi-Fi into an LTE core network, in accordance with some embodiments.

In currently-available systems, multiple radio access technologies are supported by the use of separate infrastructure for each radio access technology. For example, LTE eNodeBs are supported by MMEs, SGWs, PGWs, etc., and UMTS nodeBs are supported by SGSNs, GGSNs, MSCs etc., with little or no functionality shared between core network nodes. FIG. 1 shows the current architecture.

Reducing complexity by eliminating one or more network nodes in the core network has been difficult due to differences in functional divisions in the various RATs, as well as the difficulty in building and supporting backwards compatibility layers for each RAT. When interworking is required between each pair of RATs, development becomes expensive. Even when companies have attempted to build combination nodes, integration is expensive because supporting the superset of features on a given RAT (e.g., authentication, circuit switching, legacy protocol interworking) is difficult and expensive.

For example, an S1 interworking proxy node may be placed between an LTE eNodeB and an LTE core network (MME, SGW, PGW); an Iuh interworking proxy may be placed between a 3G nodeB and a 3G core network (SGSN, GGSN); an IuCS interworking proxy may be placed between a 3G nodeB and a 3G MSC; a circuit-switched media gateway may be placed between a 2G BTS and a 2G core network (SGSN and MSC); a Wi-Fi gateway according to the 3GPP spec could be placed between a Wi-Fi user device and a PGW; and so on. However, a multiplicity of devices is required to support all scenarios, leading to increased expense in operation of the core network.

Additionally, network operators are typically unwilling to decommission core network equipment that has been well-tested and continues to operate well. For example, this is the case for 2G and 3G legacy voice equipment, which provides voice call quality superior in many cases to VoLTE, which is not widely deployed. Elimination of these legacy network nodes is additionally difficult as a result.

Thus, although LTE hypothetically has the ability to unify all network protocols in an IP-only system, few or no LTE core network nodes exist today that can support all of the functions that are supported by the core network nodes of the UMTS network.

Various approaches are provided herein that provides connectivity and mobility to users using any of a plurality of radio access technologies, including LTE/LTE-A/LTE-U, 3G (UMTS), 3G (CDMA), 2G and 2.5G (EDGE), and Wi-Fi within a single architecture. In some embodiments a system is described wherein one or more RATs may be supported using a single front-end plugin for each RAT supporting a subset of RAT features, and without requiring support to be built out for all RAT features. In some embodiments support can be rolled out in sequential stages, for example, for network operators that have existing investments in infrastructure.

In some embodiments, a convergence gateway is enabled to interwork other radio access network interfaces with S1 or Iu, thereby providing connectivity to the RAN toward the core network and vital core network nodes such as authentication and mobility nodes. To the core network, a call or packet data session appears as an LTE call or bearer. To the user device, the call or session appears as a native RAT call/session, whether it is 2G, 3G, CDMA, or Wi-Fi.

The S2 interface (S2a, S2b) is an important interface for enabling the system described herein. S2, as described in 3GPP TS 23.402 and TR 23.852 (each hereby incorporated by reference in their entirety), is an interface for enabling wireless access gateways to permit mobile devices on non-3GPP networks to join 3GPP networks. Specifically, the S2 interface was designed to enable Wi-Fi and other IEEE networks to expose control functionality as well as data routing functionality, and to enable 3GPP networks to interoperate with eHRPD and CDMA networks, such as WiMAX and WCDMA networks, and interworking them to a 3GPP PGW gateway. Authentication and call anchoring is passed through the S2 interface and performed using the 3GPP network. In some embodiments the convergence proxy does not use S2 interface and uses local breakout or for data traffic while interworking the signaling messages with legacy components such as MSC and SGSN.

An additional important interface for enabling the system described herein is the S1 interface. While the S1-AP interface is used for providing signaling support for LTE eNodeBs, the S1-U interface is a tunneling interface suitable for tunneling IP data through to an LTE core network. Re-encapsulating packets received over another packet session, such as EDGE, Gb, IuPS, etc. into a GTP-U tunnel over the S1-U interface enables the S1 interface to be used for multiple RATs.

A third important building block of the solution described herein is the use of local breakout techniques for handling IP traffic. Other than voice calls connected over a circuit-switched protocol, the majority of traffic on wireless operator networks at this time travels over the operator network to a gateway, such as an LTE packet data network gateway (PGW), which then provides access to the Internet. This includes VoIP, web (HTTP), and other user-driven IP traffic. Certain IP traffic terminates within a mobile operator network and not on the public Internet, such as voice calls performed over VoLTE within the same operator's network; however, such calls may also be made by routing an IP session out to the public Internet and back to the operator's own network (e.g., hairpin routing).

Local breakout also is desirable sine in most or all deployments, the wireless base station has some backhaul that enables it to connect to an operator core network using underlying IP backhaul connectivity to the global Internet. The inventors have appreciated, and the embodiments described herein show, that it is possible to simplify the operator core network by directing most connections to traverse the Internet via this backhaul connection instead of using designated 2G, 3G, or 4G nodes within a core network to provide service. This technique, sometimes also called "local breakout," Selective IP traffic offload (SIPTO), or local IP access (LIPA) when used to refer to the use of non-operator-controlled IP networks, particularly by small cells, is enhanced and expanded upon to provide additional functionality in this disclosure.

Fourthly, as described above, many operators already have 3G core networks in place. In some embodiments, a simple approach is taken to retain compatibility with 3G voice calls at minimal expense. Instead of replacing the 3G core network completely, an existing 3G core network is left in place and pared down to the minimum of required components. By reusing and inexpensively maintaining the existing 3G core, compatibility is maintained with 3G technology, at no additional cost relative to the present day, without requiring the expense of purchasing new devices to replace the 3G core.

Otherwise, if an operator core network is a "greenfield" network, where 3G core networks have not been provisioned or built out, the core network can be built to support voice calling without a 3G core network and only with an IMS network, to provide voice over IP (VOIP)/VoLTE voice calling. This core network architecture enables the use of an all-IP network without legacy 3G circuit-switched calling.

FIG. 1 depicts a prior art core network architecture. On the left side of the diagram, four radio access technologies (RATs) are depicted, namely: 2G (otherwise known as GERAN), 3G (otherwise known as UTRAN), 4G (LTE or EUTRAN), and Wi-Fi access. The RATs correspond to different wireless access technologies supported by wireless clients, such as 3GPP user equipments (UEs) and Wi-Fi-equipped computers and mobile devices. In the middle of the diagram, each of the RATs has a corresponding core network that handles functions that include mobility management (e.g., handovers) and radio access coordination.

FIG. 1 is a schematic network architecture diagram for 3G and other-G prior art networks. The diagram shows a plurality of "Gs," including 2G, 3G, 4G, and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 110, the SMSC 111, PCRF 112, HLR/HSS 113, Authentication, Authorization, and Accounting server (AAA) 114, and IP Multimedia Subsystem (IMS) 115. An HeMS/AAA 116 is present in some cases for use by the 3G UTRAN. The diagram is used to indicate schematically the basic functions of each network as known to one of skill in the art, and is not intended to be exhaustive.

Noteworthy is that the RANs 101, 102, 103, 104 rely on specialized core networks 105, 106, 107, 108, 109, but share essential management databases 110, 111, 112, 113, 114, 115. More specifically, for the 2G GERAN, a BSC 101c is required for Abis compatibility with BTS 101b, while for the 3G UTRAN, an RNC 102c is required for Iub compatibility and an FGW 102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

While the core network architecture as shown is effective, it is expensive to maintain and unnecessarily duplicates infrastructure. Conceptually only two main functions are provided to users: voice calls and packetized data. However, each RAT requires a different core network to be put in place to handle the same function. In the case of 3G, two core networks are put into place, one to handle circuit-based calls and one to handle packet-based calls and data. Wi-Fi is also not effectively integrated into the network. Additionally, no synergies are realized between the networks, as each operates independently of the others, even though many of them operate on the same IP-based underlying network. Not shown are the expensive air conditioning, power conditioning, property leasing agreements, and other physical plant expenses required to maintain each of these duplicate core networks.

An approach is described for combining each of the core networks into a minimal core network suitable for providing radio access to user devices that support LTE and beyond, while providing legacy support for other RATs. Each legacy RAT may be supported at the RAN level, but the core network for each RAT may be replaced by a single converged core network. To provide data service, the converged core network shall use the LTE framework, and shall use IP. To provide voice service, the converged core network shall use either a 3G circuit core network infrastructure (MSC, VLR) or a packet-based LTE infrastructure such as VoLTE. Interworking shall be provided to enable legacy core network nodes to be removed from the network.

The described approach has the advantage that several functions previously separated among several disparate core networks may be reunited into a single core network node, here called the convergence proxy/gateway. This enables network operators to perform optimizations across several RATs. As well, the convergence proxy may be built with modern hardware and software virtualization techniques that enable it to be scaled up and down as needed within the network to meet needs on any of the supported RATs, thereby enabling network expansion and virtualization. This architecture thus paves the way for increased numbers of connected nodes (e.g., for Internet of Things (IoT)), and for the increased bandwidth and densification as projected to be required by 5G.

The described approach also enables increased intelligence to be pushed to the edge of the network. When combined with the virtualization technology described in U.S. Pat. Pub. No. 20140133456 (PWS-71700US03), hereby incorporated by reference in its entirety for all purposes, which allows a virtualization gateway to act as a proxy to enable a large radio access network to be subdivided into independently managed sections, intelligence may be added in a large scale way to a large, heterogeneous radio access network by pushing the required intelligence out from the expensive to maintain core network to virtualization/convergence nodes situated one hop away from the edge of the network. This architecture allows new services to be provided, such as: content delivery caching, scaling, and optimization; data offload for local voice or local data breakout; specialized APIs for smartphone apps; VoIP and VoWiFi integration; within network free calling without using expensive international or long distance circuits or trunks; femto cell integration; machine-to-machine applications; integration of private enterprise RANs with the core network; core network sharing; and other services, each of which could provide an additional revenue stream.

A detailed explanation of how each RAT will be supported follows.

In some embodiments, 2G services may be provided by enabling a standard base station, or BTS, to connect to the convergence gateway directly via a standard BTS-MSC interface, the A interface. Software and hardware to enable 2G base stations according to the Global System for Mobile Communications (GSM) are readily available, including base station software to enable radio baseband functions and to handle interactions with a 2G GSM handset, such as the open source OpenBTS project. Such BTS software is often configured to use the A interface over an IP protocol backhaul link, and many operators have migrated their networks to run on IP and use a modified version of the A interface over IP links (A-over-IP). The convergence gateway may be configured with the appropriate A interface compatibility to enable it to interoperate with such BTSes from multiple vendors.

In some embodiments, the convergence gateway operates as a back-to-back user agent (B2BUA) or BTS/MSC proxy between a BTS and the 2G/3G MSC core network node, virtualizing the BTSes from the MSC and the MSC from the BTSes. The existing legacy 2G/3G MSC is able to handle circuit-switched calls, SS7 calls, and other types of calls that are difficult to simulate or interwork in the modern IP-based environment. This mode of operation does utilize an existing 2G/3G MSC core network node. However, as mentioned above, it is advantageous to be able to leverage the existing 2G/3G infrastructure to provide a solution that "just works" and preserves legacy compatibility without introducing additional cost.

In some embodiments the convergence gateway may use the Iuh interface, not the A interface, to enable an enhanced 2G base station or combined 2G/3G base station to communicate with it. Iuh is the interface used according to certain UMTS standards for communication over an IP link between a femto cell and a femto cell gateway, otherwise known as a home nodeB gateway, including nodeB registration (e.g., HNBAP) as well as control and user data messages (e.g., RANAP); Iuh supports transport of IuPS and IuCS user data flows, as well as signaling flows, and is therefore suitable for handling 2G calls. The base station in this case could be responsible for interworking between the A interface (or the Um interface) and the Iuh interface. The enhanced 2G base station could operate as a small cell as described below in relation to 3G services. The convergence gateway may use Iuh to provide signaling capability to the base stations.

In some embodiments, 3G services may be provided using a convergence gateway that is configured to act as a standard RNC, SGSN, and GGSN in relation to standard nodeB base stations. The base stations may communicate to the convergence gateway via the IuPS and IuCS interfaces. The convergence gateway may be configured to act as a B2BUA and proxy for the nodeBs toward communicating with a 3G MSC/VLR. The convergence gateway may be configured to virtualize the nodeB toward the core network. Alternately the convergence gateway may provide RNC, SGSN, and/or GGSN functions internally as software modules.

In some embodiments, 3G services may be provided using a nodeB in communication with the convergence gateway via the Iuh interface, as described above. The nodeB may be configured to act as a small cell according to the standard femto cell specifications, and the convergence gateway may treat the 3G nodeB as a standard 3G home nodeB.

IuCS interface communications may be proxied by the convergence gateway toward a 3G circuit core network node, the 3G MSC/VLR. Iuh and IuPS interface communications may be handled in several different ways: forwarding Iuh circuit-switched communications to an existing 3G core, interworking of IuPS to LTE or directly to IP, such as for local breakout, or terminating IuPS communications at the convergence gateway and providing the underlying IP packet data services via an underlying IP backhaul connection at the convergence gateway (e.g., local IP breakout). Each of the inbound service requests that is a request for IP is handled via interworking, and service requests for circuit connections are handled by forwarding to the 3G core. It is noted that voice calls in the present architecture are often provided using RTP and packet-based MSC nodes, and as such, the convergence gateway may make use of RTP that is encoded by the BTS or nodeB to provide 3G voice services. The use of RTP and IP provides advantages for both 3G and 4G services as described hereinbelow.

Additional functions may be provided by the convergence gateway in conjunction with 3G service, in some embodiments. In some embodiments, RTP streams that originate and terminate within a single RAN, or within a single sub-network managed by the convergence gateway, may be redirected at the convergence gateway back toward the RAN instead of unnecessarily traversing the core network; this is known as RTP localization. RTP streams are typically used by many 3G nodeBs to encode and transport voice calls over IP. In order to provide RTP localization in this fashion, no change in signaling on the control plane is required, and network address translation may be sufficient in many cases to provide this functionality for the data packets themselves.

In some embodiments, handover optimization and paging optimization may be performed, to reduce signaling and load due to handovers or paging on the core network. The term optimization here and throughout this disclosure is used only to mean enhancement or improvement, not to mean identification of a single best method. Handovers within the same RAN or sub-network managed by the convergence gateway may be performed without interaction with the core network. Paging may be reduced by keeping track of UEs within the RAN or sub-network. Further detail about paging and handover optimizations may be found in U.S. patent application Ser. Nos. 14/806,594, 14/822,839, and 61/724,312, each hereby incorporated by reference in their entirety.

In some embodiments, data traffic may be redirected away from the 3G core network to the Internet. According to the conventional UMTS architecture, packet-switched (PS) UMTS bearers are GTP-U tunnels for data that is intended to go to or from the public Internet are terminated on one end at the UE and at the other end at a core network gateway, such as a GGSN that provides connectivity to other networks, such as the public Internet. In the conventional UMTS architecture, the GGSN extracts an IP payload from the GTP-U tunnel and sends it over the Internet. By contrast, in the present disclosure, the convergence gateway may identify that certain traffic is intended for the public Internet or for other connected networks, and may perform the de-encapsulation function previously performed by the GGSN, thereby eliminating the need for the GGSN to perform this function.

In some embodiments, SGSN functionality may be performed at the convergence gateway. For example, the SGSN in the conventional UMTS architecture is responsible for tracking UEs as they have mobility across different nodeBs. A convergence gateway according to the present disclosure is capable of tracking UEs within its managed sub-network of RANs, and may perform mobility management so that when data or calls come in from the core network or from the public Internet, the convergence gateway may direct the inbound traffic to the appropriate RAN directly. Each RAN being connected via IP to the convergence gateway, the convergence gateway can perform this tracking by IP address and can perform network address translation to ensure the core network has a single IP address for the UE at any particular time.

In some embodiments, the convergence gateway may interface with a conventional radio network controller (RNC) as a virtual MSC. The convergence gateway may use the standard IuCS and IuPS interfaces to communicate with the RNC, for example, to allow the RNC to interoperate with a conventional macro cell or nodeB. This enables the convergence gateway to provide 3G services to conventional nodeBs without having to emulate or reverse engineer any proprietary Iub interface, as that communication is performed by the RNC. In some embodiments the convergence gateway may use an Iur interface to communicate with conventional RNCs as a virtual RNC. In this case convergence gateway acts as a IuCS and IuPS proxy towards 3G MSC and 3G SGSN respectively. In some case convergence gateway may simply act as IuCS proxy while doing local breakout of data traffic.

4G LTE services may be provided as follows. Several possible embodiments are contemplated. In the conventional LTE architecture, voice call services are provided either as 3G voice (circuit-switched fallback or CSFB) or as data. Initial LTE deployments did not have a capability for native voice calls over LTE, and voice over LTE (VoLTE) is currently in the process of being deployed. VoLTE uses a data infrastructure known as IP Multimedia Subsystem (IMS) to provide signaling support, and uses data-based protocols such as SIP and RTP to provide voice data transport. According to conventional VoLTE, an LTE UE is attached to an LTE network and registered with an IMS core network, which then provides the ability to call other phone numbers. In the present disclosure voice calls can either be interworked to 3G CS calls or delivered using a VoLTE IMS core network; each approach has different advantages.

An LTE eNodeB is provided that is in communication with a UE. The eNodeB is also in communication with a convergence gateway, which may enable virtualization of the eNodeB and other eNodeBs by virtue of the convergence gateway acting as a B2BUA and proxy toward the LTE core network, as described elsewhere herein. When a UE attempts to connect and register with the LTE and IMS core networks, the convergence gateway establishes a data bearer for the UE with the core network, but instead of registering via IMS, performs a registration of the UE as a 3G client with the 3G MSC/VLR. The UE and the eNodeB receive confirmation that the UE is permitted to use both the LTE and IMS core networks. Next, when the UE initiates a call according to a conventional VoLTE protocol, the UE sends the appropriate SIP protocol messages toward the core network, which are interworked by the convergence gateway into 3G messages for the 3G MSC, e.g., SIP to IuCS interworking. Once the call is connected, the UE will send RTP data packets carrying voice data to the convergence gateway, which will then forward them to the aforementioned 3G RTP and IP-based MSC. This allows for transparent interworking of 4G LTE VoLTE calls to 3G calls without the need for an IMS core.

In some embodiments, the convergence gateway may enable integration of VoIP calls with ordinary cellular voice calls. Carriers want to provide mobile App to offer value added services along with VoIP calling. Typically VoIP apps are not tightly coupled with mobile OS, but are instead pushed to the background when mobile phone receives a phone call, which can create unwanted results (e.g., termination of the VoIP call) when VoIP apps are in middle of phone calls. It is desired to coordinate native mobile calls with mobile apps to improve the user experience.

In some embodiments, IN triggers are used to provide integration. IN Triggers are a well-known way of creating triggers to enable intelligent services. See Reference (http://www.3g4g.co.uk/Tutorial/ZG/zg_camel.html). While they work well for popular IN services e.g. Number Portability, 800 number lookup etc., they are difficult and very expensive for new & innovative services due to the old/unsupported nature of this technology.

In some embodiments, a Number Portability Trigger may be used. This approach assumes a SIP soft switch that handles VoIP app calling. Normal SIP related call features are assumed i.e. active registration status, active call status, SIP call forking etc. LRN (Local Routing Number) in the number portability database is registered for the VoIP app users. LRN resides on SIP Soft Switch. In case of actual ported number, Soft Switch needs to take care of final LRN. The soft switch is provided at the convergence gateway, in some embodiments.

In some embodiments, a call flow using a Next hop soft switch provided at the convergence gateway is detailed. This approach assumes a SIP soft switch that handles VoIP app calling. Normal SIP related call features are assumed i.e. active registration status, active call status, SIP call forking etc. All calls before going to MSC are routed via Soft Switch (using numbering plan/routing tables). Soft Switch decides if it should deliver call to the App via VoIP or native dialer via MSC.

In some embodiments, a further call flow using a convergence gateway is detailed, based on idea to use the convergence gateway as a virtual decentralized core. This is a call flow using a next-hop soft switch. The convergence gateway is configured to enable an API for VoIP app to leverage and achieve similar result, i.e. get trigger for incoming calls and many other innovative services e.g. location based trigger. This convergence gateway based solution allows a user or operator to bypass long distance/international carriers (among subscribers) by local breakout for even native dialer calls.

In some embodiments, a mobile OS native dialer is integrated with a VoIP dialer, streamlining the UI to improve presentation of the problem, and treating VoIP calls as equal to native calls for, e.g., phonebook presentation for outgoing calls and incoming call identification, hold and merge.

In some embodiments, a convergence gateway API may be made available to reroute ordinary circuit-switched (CS) calls. This API may be configured and exposed at the convergence gateway, and may be accessed using a specially configured phone or using an app on a smartphone. This may reroute existing CS calls from the smartphone to directly connect to other nodes that are accessible on the network, creating a peer-to-peer or local network topology, and avoiding a "hairpinning" route topology that goes out to a gateway and back into the same local network.

This also allows for non-VoLTE voice calls to be handled in a similar manner, transparent to the UE. For example, mobile apps such as Skype™, WhatsApp™, and other applications installed on handsets may be treated as peers and may be given the ability to make calls through the 3G MSC. However, handling of native voice calls and VoIP calls is currently limited. For example, In Apple's iOS 10, the dialer app has been reworked so that a VoIP call can be made from the phone's native address book. See http://www.nojitter.com/post/240171745/apple-reinvents-mobile-uc, incorporated by reference in its entirety. Google Android offers native dialer integration by the applications as well. However, while these approaches may help streamline the UI, this still does not fix the issue of native mobile call suspending the VoIP calls.

In some embodiments, a user may be on a VoIP app call. The user's mobile device may be equipped to perform call management functions. such as call waiting, swap, or hold, for native phone calls delivered via a 2G/3G/4G or other cellular network (also identified herein as standard phone calls, legacy phone calls, circuit-switched phone calls, or SS7-compatible phone calls). In certain cases, the user's mobile device may also be equipped to enable the VoIP app to perform call management functions for VoIP app calls, so that the mobile device is able to provide, for example, call waiting, swap, or hold for VoIP app calls. However, the user's mobile device typically is not configured to provide call waiting, etc. if a VoIP call is interrupted by a native phone call, or if a native phone call is interrupted by a VoIP call or app call. These functions can be made possible to be performed by the following method.

In some embodiments, a convergence gateway may be in the flow of a call currently in progress with the mobile device. The convergence gateway may determine what kind of call is in progress. For example, the convergence gateway may decrypt a GTP-U tunnel or otherwise de-encapsulate a tunnel, may intercept or proxy S1 or other operator signaling or SIP/RTP signaling, or may perform other types of packet inspection/characterization or inspection of data inside a tunnel. Many other examples may be known in the art of ways to determine whether, at a gateway node, a call is currently in progress according to VoIP, RTP, CS, SIP, or another protocol. The convergence gateway may use this state to enable the API functionality described below.

Special application programming interfaces (APIs) or triggers may be used to enable special treatment of such calls, with some embodiments thereto described below. The API may be used to: request handover from a special VoIP protocol to a non-VoIP legacy connection; request information regarding whether a specific call is a VoIP call or a non-VoIP call; request information regarding information such as originating party or IP address or underlying protocol; request features such as call forwarding, call hold, multi-way calling, etc., or SIP functions such as active registration status, active call status, call forking to be enabled on a VoIP call; request transcoding or transrating of a VoIP call; provide authentication credentials for a VoIP call device requesting to be handed over or connected to a legacy connection; and other functions.

The API may be enabled for access at the convergence gateway by network nodes in the operator core network such as a soft switch or number portability database, or by native call infrastructure such as a MSC or circuit-switched core network node. The API may provide an interface via HTTP, XML/SOAP, or another protocol, over an IP transport or another transport. The API may be enabled for and/or accessed by a UE app, in some embodiments, or by a server in communication with a UE app (e.g., a Skype or Apple FaceTime server), or both.

The API may provide operator network support or UE app support for one or more call support functions, such as, for example, call waiting, call hold, call swap, or call joining. The API may cause the convergence gateway to perform one or more SIP functions or other call management functions. The convergence gateway may be a SIP endpoint or back-to-back user agent (B2BUA) or SIP proxy for SIP calls, which may include both native calls delivered using SIP and VoIP SIP calls.

In operation, when a call is initiated by a VoIP app, the VoIP app may inquire (either from the UE app itself or from a server component of the app) with a convergence gateway using the API as part of initial call setup whether a call should be completed via a native dialer call or a VoIP protocol. The VoIP app may indicate whether it prefers to terminate the call via VoIP or via native call. The convergence gateway may take the requests and parameters in the request into account, as well as other information pertaining to the UE, such as whether the UE is currently in the middle of a VoIP call or a native dialer call, or whether the UE is currently available or unavailable for circuit-switched calls, and may return information to the VoIP app regarding call termination. The VoIP app may then be permitted to complete the call. The same procedure could be performed by a gateway making native calls. In either situation, the convergence gateway may transcode or transrate a call from VoIP to native, or vice versa, as appropriate to enable an app to deliver calls over native, and vice versa, even when the app does not have this capability built in.

In some embodiments, the convergence gateway could go further and enable direct connection/termination of calls, regardless of whether the call is a VoIP call or native call, where the source and destination of the call are within a certain local network domain, thus avoiding undesirable hairpin routing (e.g., traffic that is routed out of a network and immediately is routed back into the originating network). RTP localization is another term that refers to this functionality or similar functionality, which could be enabled using the API at the convergence gateway.

In some embodiments the dialing app may also determine whether the native dialer has integration built in for VoIP apps, such as the Apple iPhone dialer for Apple iOS 10 and up, and may allow the UE to choose its own app to terminate the call to the user.

Traditional SIP-based virtual call routing systems like Google Voice permit the use of SIP call forking, etc. to terminate calls at a plurality of devices. However, the present disclosure differs from SIP-based call routing systems such as Google Voice™, for example, at least in that it takes into account whether a call is currently ongoing, whether the call is a VoIP or native dialer call, and provides ways for a mobile network operator and/or mobile device to terminate a call at a mobile device in the most appropriate or effective format. The present disclosure also describes performing interworking, transcoding, etc. at, e.g., a convergence gateway to enable this functionality for a wide variety of terminal devices and mobile operator networks. The present disclosure also describes providing an API at the convergence gateway to enable control of this functionality.

The convergence gateway may be enabled to aggregate SCTP and S1-AP toward the core, in some embodiments, specifically for enabling a single MME to handle all of the subnetworks and eNodeBs under the convergence gateway. RTP and other IP traffic may be handled using the underlying IP backhaul connection (e.g., local breakout), in some embodiments, providing a reduction of data traffic towards the LTE SGW and PGW. RTP localization may also be provided. In some embodiments, signaling toward the core, handover optimization, paging optimization, and message retransmit reduction may be performed by the convergence gateway for subnetworks managed by the convergence gateway, as described elsewhere herein.

In some embodiments the convergence gateway may take over all of the functions of the MME, SGW, and PGW inside the LTE core network gateway. In such an embodiment, multiple convergence gateways may be used to cover a large geographic area, such as a country.

Additional functions are described for enabling Wi-Fi and small cell interoperability with the described convergence gateway. Wi-Fi and small cells may need to be authenticated before being able to connect to an operator core network, and in the conventional art two types of gateways, trusted wireless access gateways (TWAGs) and evolved packet data gateways (ePDGs) are known. The convergence gateway may be an ePDG, a TWAG, or both, in some embodiments, acting as an ePDG for untrusted Wi-Fi access points and as a TWAG for trusted Wi-Fi access points. S2 and S2x interfaces may be used to cause packet flows to be allowed entry into the LTE core network at the PGW, thus allowing Wi-Fi users to access the LTE core network. However, since 2G, 3G, and Wi-Fi are all processed as IP packets in the above scenario, S2 and S2x can be used to provide entry for sessions using each of these RATs into the LTE core network, thereby allowing a single LTE core network to provide the necessary core support for 2G, 3G, 4G LTE, and Wi-Fi. Enterprise femto networks, private LTE networks, and public safety networks can also be treated as LTE networks using the TWAG and S2/S2x approach, enabling the convergence gateway to act as a virtualized hosted small cell gateway. In some cases, a convergence gateway may do local breakout of Wi-Fi data and eliminate the need for PGW.

As 2G, 3G, 4G LTE, and Wi-Fi technologies as configured above are all able to be routed through a convergence gateway, opportunities arise for improving the performance of all the networks synergistically, such as by sharing resources or information across RATs. Self-organizing network (SON) capabilities may be leveraged across multiple technologies. For example, users can be moved to the least loaded access network by combining visibility at the convergence gateway across 3G, LTE, and Wi-Fi. Some additional techniques that may be used on the convergence gateway are described in U.S. Pat. Pub. 20140233412 and U.S. Pat. Pub. No. US20160135132, each of which is incorporated by reference in its entirety.

In some embodiments, within the convergence gateway, an access module (frontend module) is configured with a modular architecture. The access module supports a stub module for each access component. The access components depicted include: a HNB access component for 2G/3G packet-switched data and circuit-switched voice, communicating with one or more 2G/3G BTSes or nodeBs via Iuh; a HeNB access component for LTE packet-switched voice (VoLTE) and data, communicating to an eNodeB via S1; an ePDG access component for untrusted Wi-Fi access; and a SaMOG access component for trusted Wi-Fi access. Other access components may be added as well, in some embodiments.

The convergence gateway may have specific modules for: RTP-Iuh interworking; 2G data to LTE interworking via a 2G proxy; 3G data to LTE interworking via a 3G proxy; IMS to LTE interworking via an IMS proxy; 2G voice to 3G voice interworking via a 3G proxy; VoIP to 3G voice interworking via a 3G proxy; and inbound protocol switching to bind each of these RATs together.

Each of the access components provides stateless or minimally stateful forwarding and interworking of inputs from the one or more access networks to the core network components described below. Interworking may be done to a standard interface, such as S2 itself, or to a non-standard interface abstracting a subset of the input interface for communicating with the core network.

Each access component may be connected to a S2x core component (S2x backend). The S2x core component provides packet data services using one (or more) LTE core networks. The S2x core component performs interworking as necessary so that it may output on an S2 interface to its connection point in the LTE core network at the PGW. The PGW admits the packet flow from the convergence gateway as coming from another trusted network within the LTE core network, and permits access to, e.g., security gateways and authentication servers via packet data networks accessible from the PGW, thereby enabling user devices on non-LTE networks to use the LTE packet data connection.

The S2x core component and IuCS core component may be coupled together. As all RANs benefit from access to packet data, all front end access components are coupled to the S2x core component. The S2x core component may perform minimal inspection of inbound data to determine if circuit-switched call processing is needed, for example, using envelope inspection or fingerprinting. When the S2x core component identifies a circuit-switched call, the S2 core component may pass the inbound data stream to the IuCS core component. In some embodiments, circuit-switched RANs may connect directly to the IuCS core component.

Circuit-switched calls may be transported over IP and/or SCTP to the convergence gateway over an arbitrary physical medium. The convergence gateway may communicate using a BSSAP or RANAP interface to the 2G/3G cells, taking the place of and/or emulating a 2G/3G RNC in communicating with the 2G/3G RAN. Instead of communicating with an MSC, however, the convergence gateway may perform, encoding, encapsulation, and interworking of the circuit-switched calls before sending the calls to the LTE core network. For handling circuit-switched voice calls from a 2G/3G RAN, these functions may be handled by a circuit-switched component, the IuCS code component, not the S2x core component. In addition to the above interworking functions, the IuCS core component performs proxying for the 2G/3G RAN, hiding the complexity of the core network from the RAN and vice versa, so that any 2G/3G RAN will be able to interoperate with the LTE core network. Via such proxying, 2G/3G CS calls can be converted to SIP calls and handled the same as VoLTE calls by the LTE IMS core network. The Iu interface used for communicating with the RAN is standardized, and therefore the convergence gateway will be able to interoperate with a RAN from any vendor providing the standard interface. If a base station uses the IuPS interface, the convergence gateway may perform interworking from Iuh to IuPS, and perform interworking form IuPS to S1. In that way, 2G/3G/4G traffic can all be served in the unified way by one single 4G core.

In some embodiments, a transcoding gateway will not be needed. In some cases, audio for calls that originate from a 2G base station will be encoded in the half rate or full rate GSM codec. These codecs are also supported by 2.5G, 3G, and 4G handsets and base stations, so if one end of the call uses a codec that is not supported by the other, the IuCS core component can request a codec downgrade to a lowest common denominator codec. However, it may be possible for the IuCS core component to perform audio transcoding, in some embodiments. As well, the IuCS core component may perform IP-IP interworking of audio before sending the audio to the circuit-switched RAN or core.

As described above, from the radio network side, the convergence gateway presents itself as an SGSN (for packet-switched connectivity) and an RNC (for circuit-switched connectivity). At the core network, packet-switched calls may be handled as though they were VoLTE calls. This will be transparent to the core network, and will not require resources beyond what is required for support of VoLTE. 2G and 3G voice calls and circuit-switched calls may be handled by handing off to the existing 3G MSC core network node, via the IuCS interface.

Handovers between radio access networks managed by the convergence gateway may be hidden from the network. From the core network side, the calls pass through the same PGW, and no handover is needed. From the radio network side, the convergence gateway acts as an MME or RNC, and performs handover in a manner transparent to the radio network. Handovers for packet-switched calls and bearers may be performed internally within the S2x core module, and handovers for packet and circuit-switched calls may be performed between the S2x and IuCS core modules. In some embodiments, an ATCF module may be present between the S2x and IuCS core components to facilitate handover capability between circuit and packet-switched calls.

Wi-Fi local breakout and enterprise functionality may also be supported, in some embodiments. An enterprise gateway or PBX may present itself as an untrusted Wi-Fi gateway, and the convergence gateway may present itself as a ePDG to the enterprise gateway, including by using MSCHAPv2 authentication, while hiding complexity to the core network by connecting directly to the PGW. For unwanted data traffic, instead of sending the traffic to the operator's PGW, the convergence gateway may transparently redirect the traffic from the S2x core module to another network interface, thereby ejecting the traffic from the network.

The benefits of the above solution include the following. A network operator may install the convergence gateway and immediately enable voice calls over the LTE core network for one or more RANs. The operator may test the performance of the rollout gradually. The operator may, when satisfied with performance, completely deactivate both the 3G packet core and the 2G/3G circuit core, thereby reducing power and footprint requirements for their core network infrastructure. Additionally, the LTE core network itself may be simplified, as the SGW and MME nodes themselves may be subsumed by the convergence gateway. Additionally, the operator is also enabled to interwork VoLTE or Wi-Fi calls to 2G voice calls and deliver these calls over a standard 2G BTS.

Figure 12:
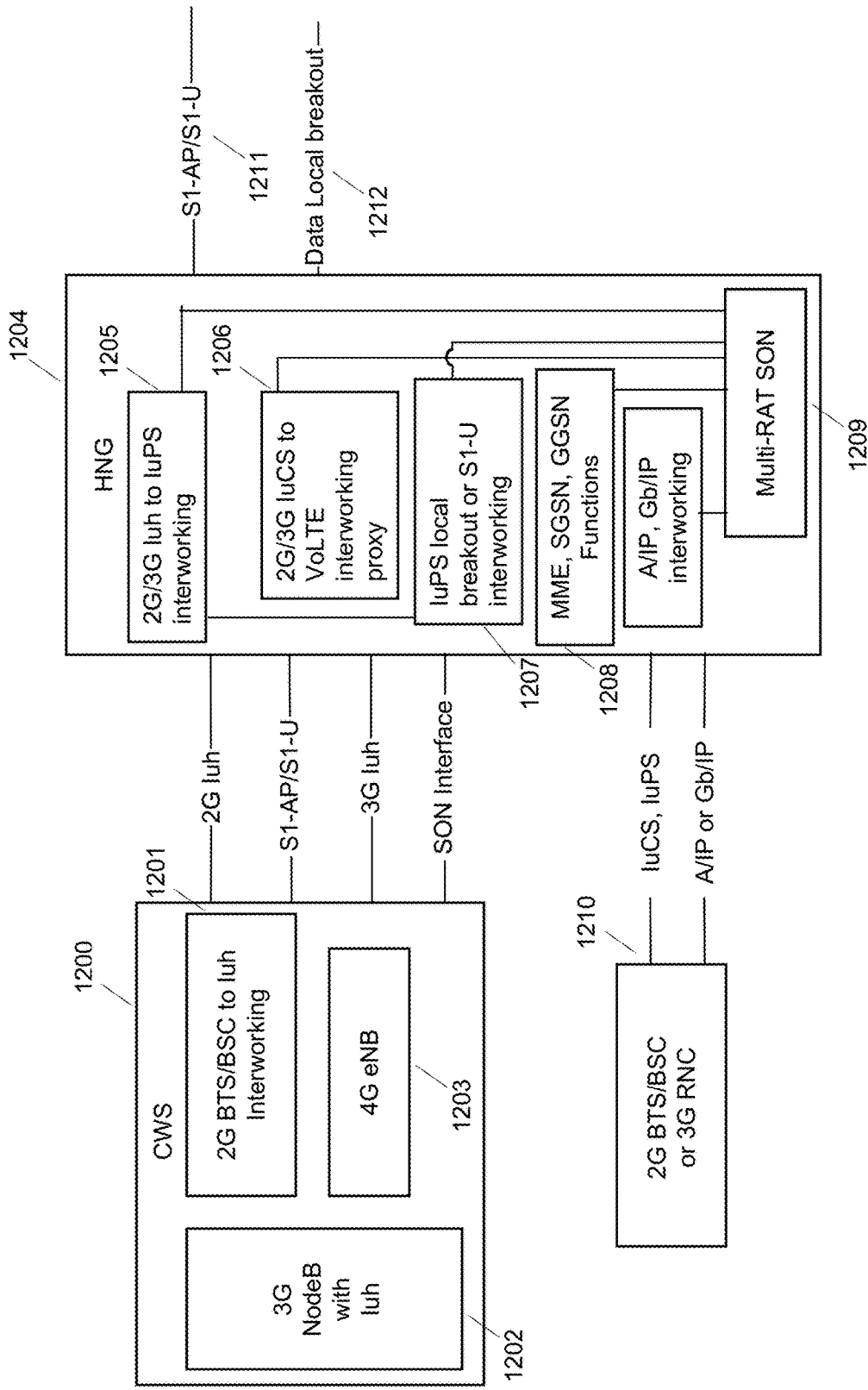
FIG. 12 is a network architecture diagram showing a block diagram of a multi-RAT node and a convergence gateway, the convergence gateway having S1 and local breakout interfaces toward a core network, in accordance with some embodiments.

Table 1 summarizes some characteristics of certain embodiments of a convergence gateway in accordance with FIG. 12.

TABLE 1

| RAT | Signaling type | HNG input signal | HNG output signal |
| --- | --- | --- | --- |
| 2 G | Signaling | A/IP or Gb/IP | Interworking to VoLTE or absorbed at local GGSN/SGSN |
|  | Signaling (Iuh) | Iuh | IuCS to VoLTE and IuPS to local breakout or S1-U |
|  | Calls | A/IP | Interworking to VoLTE |
|  | Data | Gb/IP | Local breakout or S1-U |
| 3 G | Signaling | Iuh | Absorbed at local SGSN/GGSN, or interworking to VoLTE and local breakout or S1-U |
|  | Calls | IuCS | Interworking to VoLTE |
|  | Data | IuPS | Local breakout or S1-U |
| 4 G | Signaling | S1-AP | Absorbed at local MME, or S1-AP to 4 G core |
|  | Calls | S1-U (VoLTE) | Local breakout or interworking to VoLTE, IMS core via S1-U |
|  | Data | S1-U | Local breakout or S1-U |
| Wi-Fi, etc. | Signaling | S2a/S2b | Absorbed at local MME, or S2a/S2b to 4 G core, or local breakout |
|  | Calls | S2a/S2b (VoLTE) | S2a/S2b to PGW to IMS core, or local breakout |
|  | Data | S2a/S2b | S2a/S2b to 4 G core, or local breakout |

In some embodiments, a phased approach could be used to introduce convergence gateway architecture to an operator's wireless network. Four proposed phases are described below.

Figure 3:
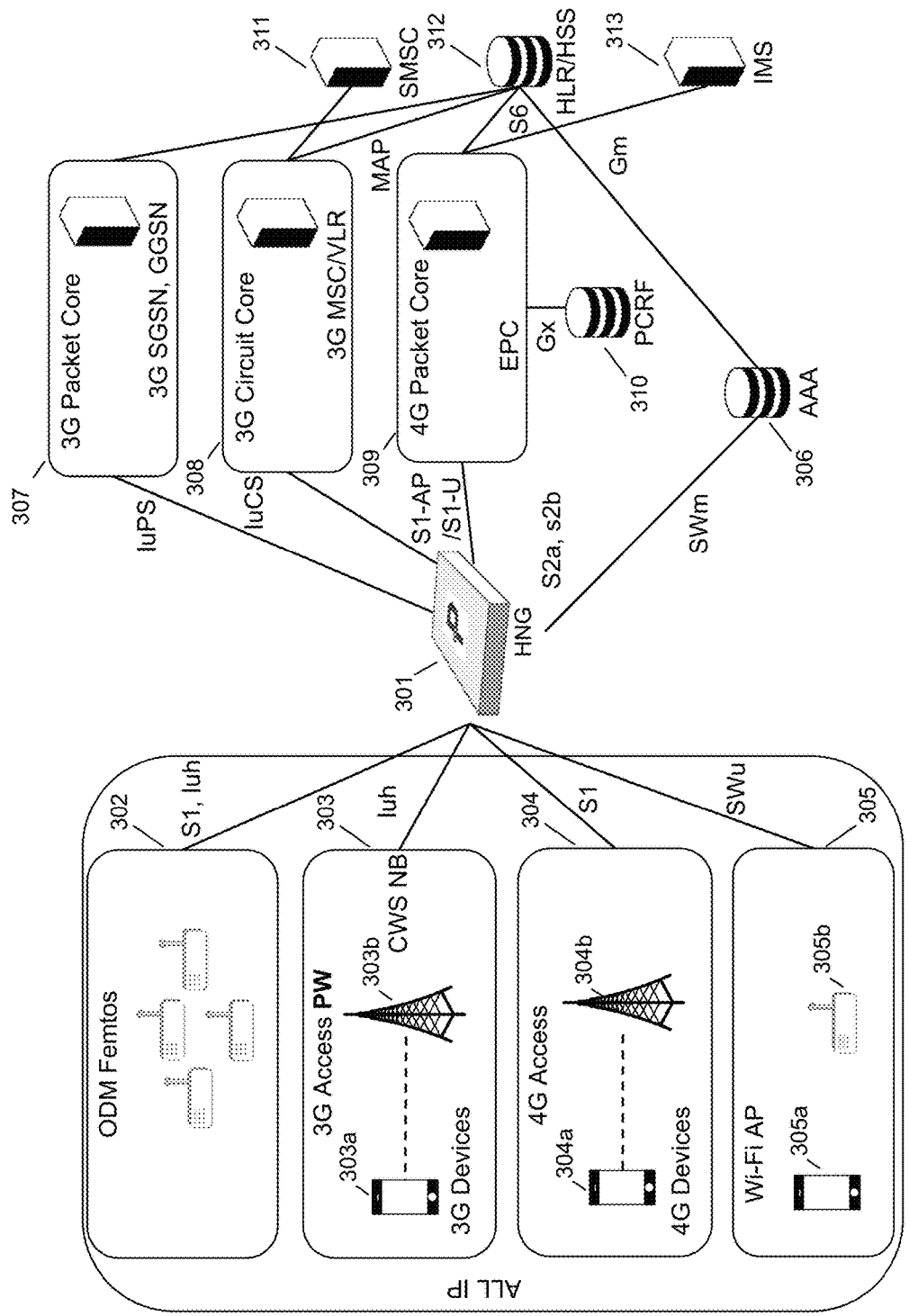
FIG. 3 is a network architecture diagram showing a first phase of introduction of a convergence gateway into a wireless operator network, in accordance with some embodiments.

In Phase 1, shown as FIG. 3, a wireless operator could introduce a convergence gateway into the network for LTE, for 3G, and for Wi-Fi, maintaining an existing 3G packet core and 3G circuit core, as well as 4G packet core/EPC.

This architecture provides advantages for scalability of existing services. Additionally, it enables Wi-Fi calling, as well as 3G access, 4G access, and standards-compliant femto cells (original device manufacturer, or ODM, femtos) from a variety of manufacturers, and also provides the convergence gateway's virtualization, scalability, SON, and other advantages. Use of enhanced nodeBs as described herein can also permit all RAN traffic to be on IP, providing cost savings.

In an alternative Phase 1 deployment, a wireless operator could introduce a convergence gateway into the network for LTE, with support for outdoor macro, enhanced multi-RAT base stations (such as the Parallel Wireless CWS™ base station), and generic femto cells (residential, enterprise); introduce a convergence gateway for 3G, with Parallel Wireless CWS, generic femto cells (residential, enterprise); and introduce a convergence gateway for Wi-Fi, enabling a VoWiFi calling offering and a carrier Wi-Fi offering. Benefits include: virtualizing the existing core and adding more capacity by offloading signaling & data; enabling Femto offerings; VoWiFi; SON & Inter cell Interference coordination; CAPEX/OPEX savings; and public transport Wi-Fi and small cells.

Figure 4:
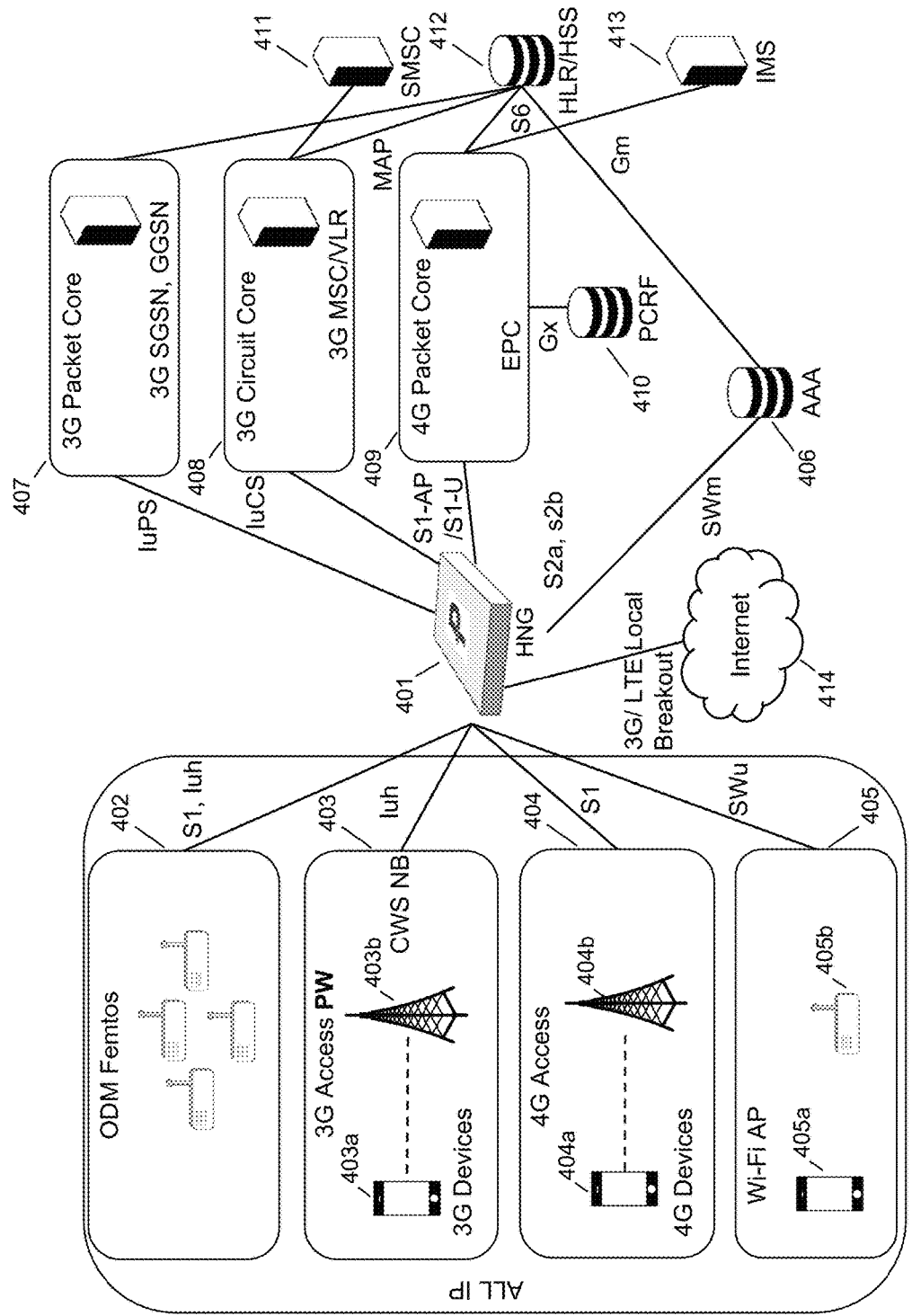
FIG. 4 is a network architecture diagram showing a second phase of introduction of a convergence gateway into a wireless operator network, in accordance with some embodiments.

In phase 2, shown as FIG. 4, an operator may enable LTE local breakout in the convergence gateway, which reduces traffic towards PGW and thereby eliminates the need to scale it; call detail record (CDR) generation; legal intercept (LI) integration; and may enable 3G data local breakout in the convergence gateway, which reduces traffic towards GGSN (eliminates the need to scale it); CDR generation; LI integration. Virtualizing the data offload frees up (or eliminates) PGW, SGSN, and enables the following functions: Femto offerings with local breakout; Low latency traffic to the internet (including cached video); Private LTE network; and CAPEX/OPEX savings.

Figure 5:
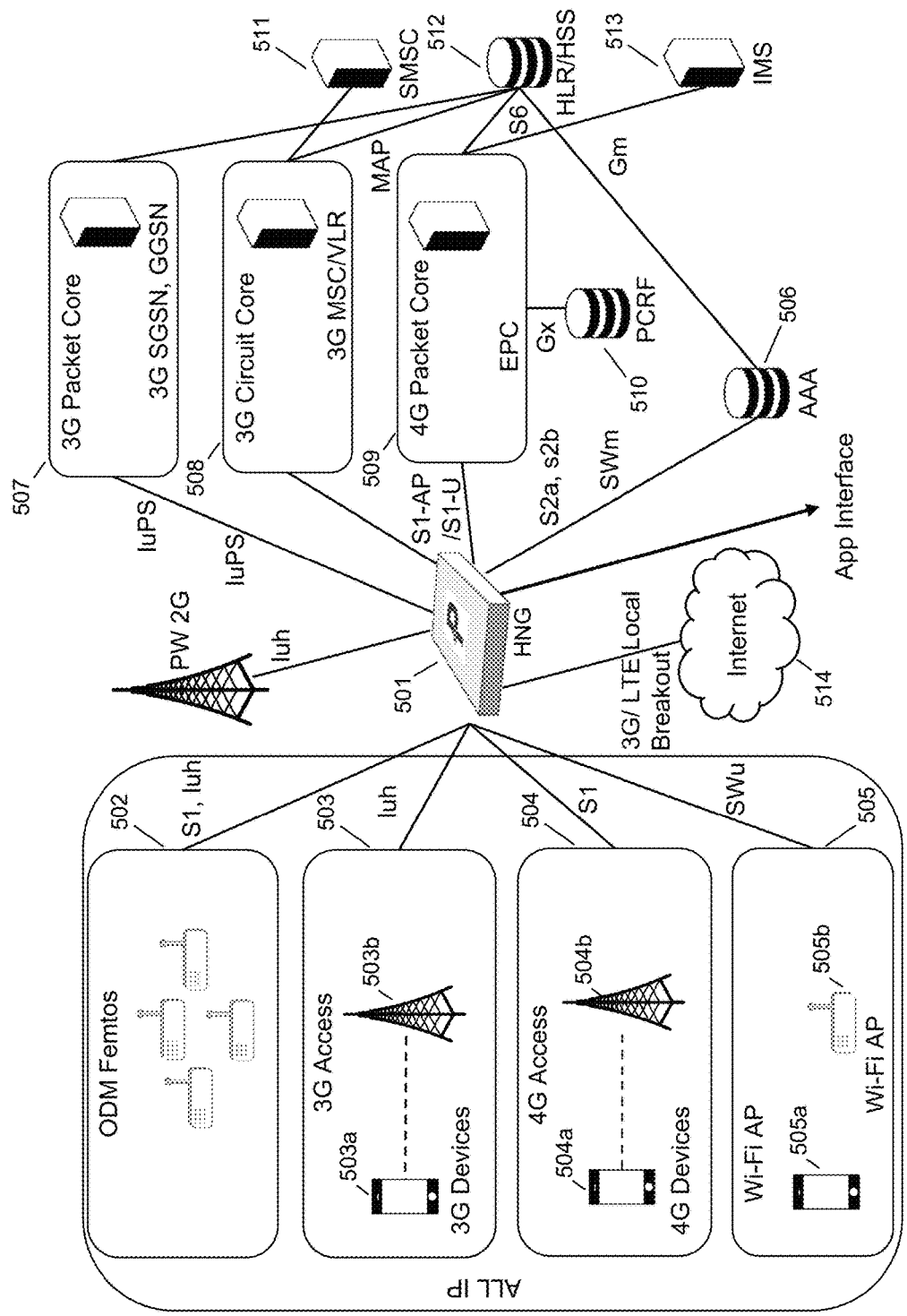
FIG. 5 is a network architecture diagram showing a third phase of introduction of a convergence gateway into a wireless operator network, in accordance with some embodiments.

In Phase 3, shown as FIG. 5, an operator may enable a virtual MSC on the convergence gateway for existing 3G Macros. This enables RTP localization; enables optimized HO; eliminates need for MSC, SGSN, GGSN scaling. This also provides the following feature advantages: SON; API Enablement; smartphone apps; IOT/M2M; Femto support. Virtualizing the MSC adds more capacity in the network by offloading the existing MSC. An app framework for innovative smartphone applications may be enabled. This phase also enables: RTP localization; optimized handover; and eliminates the need for MSC, SGSN, GGSN scaling; New revenue streams from apps and CAPEX/OPEX savings may also result.

Figure 6:
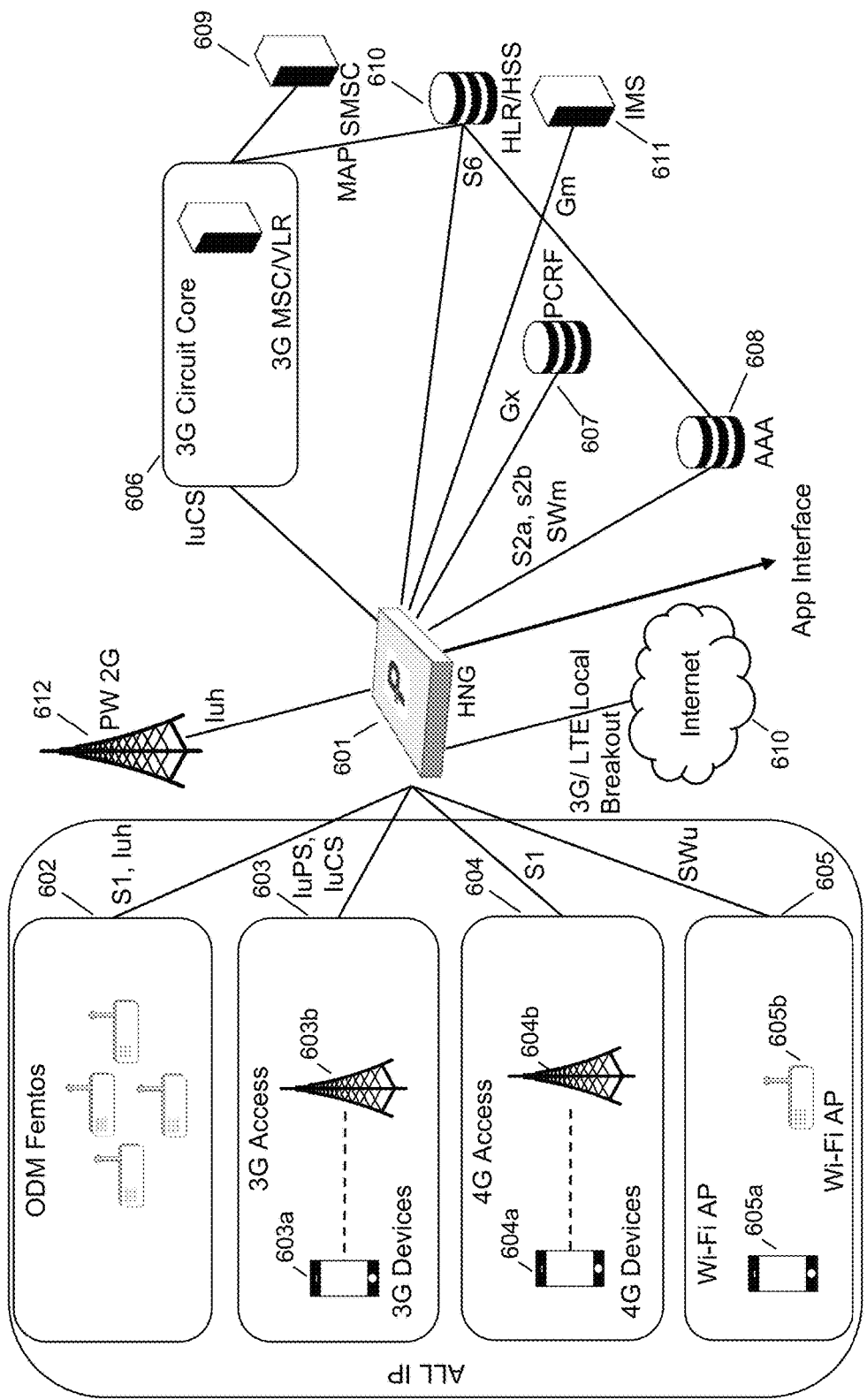
FIG. 6 is a network architecture diagram showing a fourth phase of introduction of a convergence gateway into a wireless operator network, in accordance with some embodiments.

In phase 4, shown as FIG. 6, the convergence gateway absorbs MME and SGSN functionality. While the operator may continue to use circuit switched voice MSC for voice for legacy applications (including non-VoLTE), the operator may enable mobile edge computing (MEC) for exotic applications. This Simplified Virtualized Core Network is scalable on commodity hardware in a data center, and ready for 5G, with significant CAPEX and OPEX Savings, and on modern management interfaces.

Figure 7:
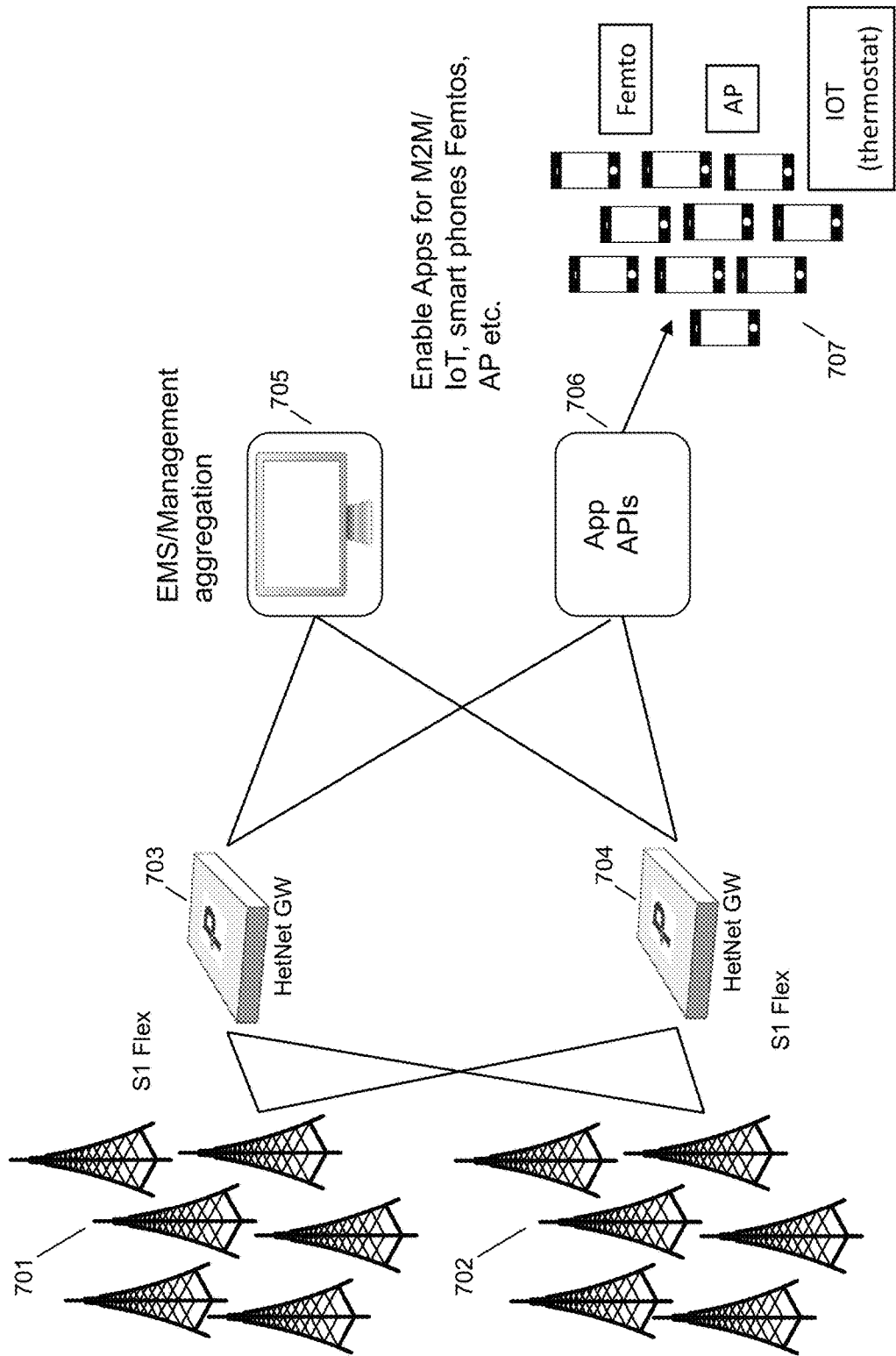
FIG. 7 is a network architecture diagram showing providing applications (apps) for machine-to-machine (M2M) applications, smartphones, femto cells, access points (APs), etc, in accordance with some embodiments.

FIG. 7 shows a conceptual architecture for providing apps for machine-to-machine (M2M) applications, smartphones, femto cells, APs, etc. Apps may be supported using APIs that are provided at the convergence gateway, with EMS/management aggregation of the smartphones and M2M clients being enabled via the apps and the convergence gateway using an element management system (EMS) accessing records and data collected at the convergence gateway. The convergence gateway may use an S1-flex interface or another interface to interact with a wireless network.

Figure 8:
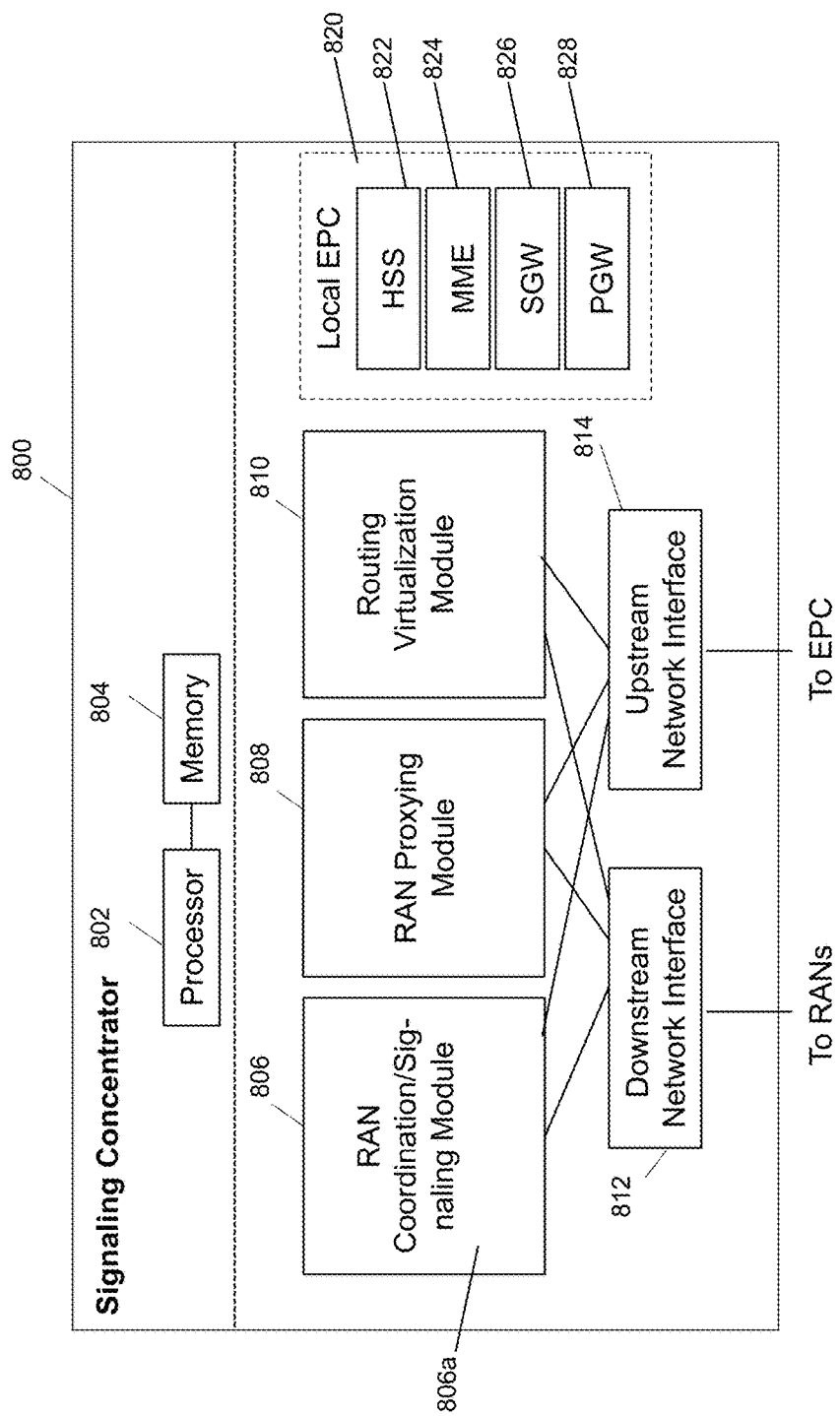
FIG. 8 is a network architecture diagram showing a block diagram of a convergence gateway, in accordance with some embodiments.

FIG. 8 is a network architecture diagram showing a block diagram of a convergence gateway, in accordance with some embodiments. Signaling coordinator 800 includes processor 802 and memory 804, which are configured to provide the functions described herein. Also present are radio access network coordination/signaling (RAN Coordination and signaling) module 806, RAN proxying module 808, and routing virtualization module 810.

RAN coordination module 806 may include database 806a, which may store associated UE signal quality parameters and location information as described herein. In some embodiments, SON coordinator server 800 may coordinate multiple RANs using coordination module 806. If multiple RANs are coordinated, database 806a may include information from UEs on each of the multiple RANs.

In some embodiments, the coordination server may also provide proxying, routing virtualization and RAN virtualization, via modules 810 and 808. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet). Signaling storm reduction functions may be performed in module 806.

SON coordinator 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

Figure 9:
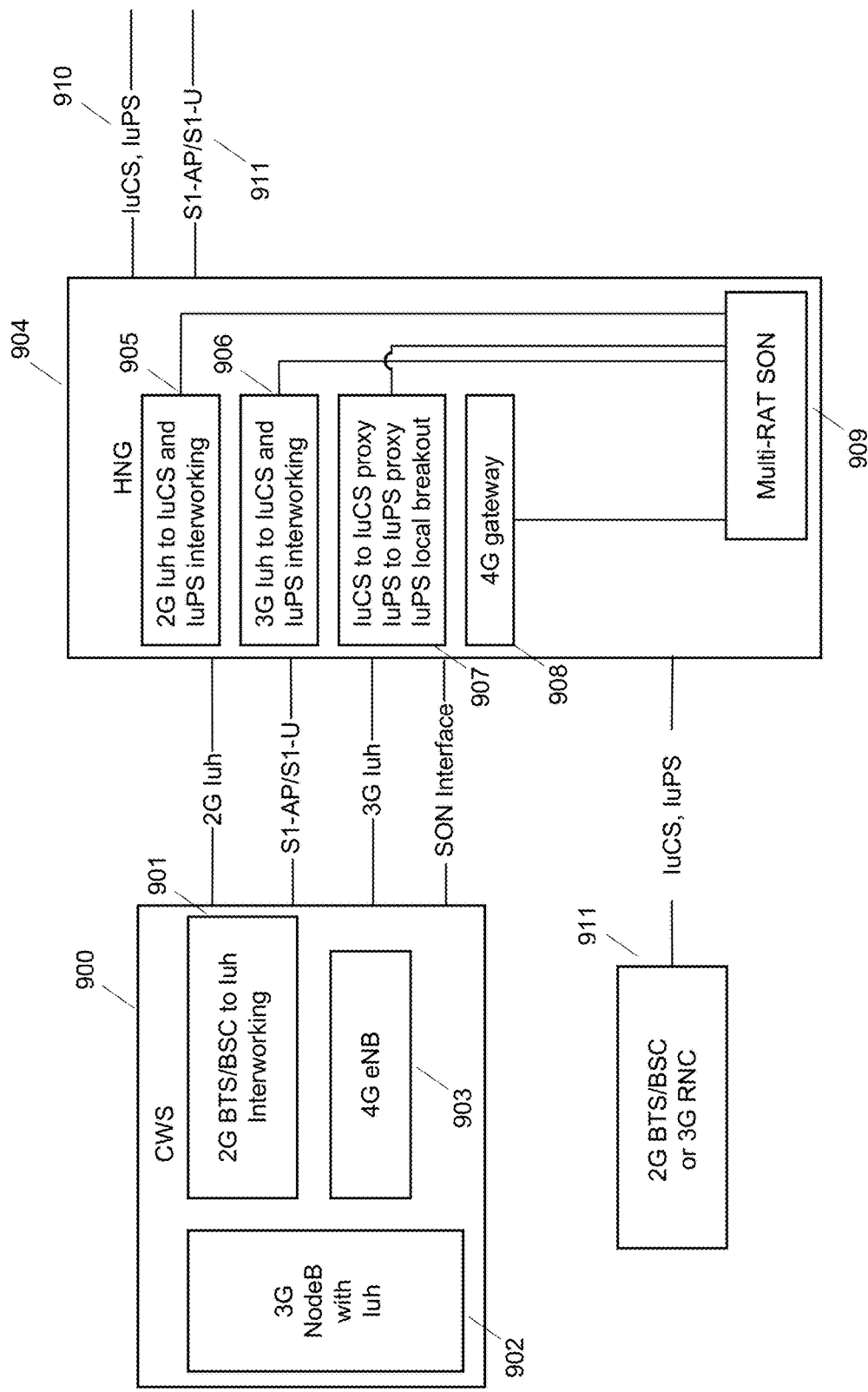
FIG. 9 is a network architecture diagram showing a block diagram of a multi-RAT node and a convergence gateway, the convergence gateway having IuCS/IuPS and S1 interfaces toward a core network, in accordance with some embodiments.

FIG. 9 is a network architecture diagram showing a block diagram of a multi-RAT node and a convergence gateway, the convergence gateway having IuCS/IuPS and S1 interfaces toward a 3G and 4G-capable core network, in accordance with some embodiments. CWS 900 is a Parallel Wireless enhanced base station, with 2G RAT 901 including BTS and BSC, as well as Iuh interworking; 3G RAT nodeB 902, with Iuh as well; and a 4G eNodeB 903. CWS 900 is in communication with HNG 904, which is a Parallel Wireless convergence gateway, over four interfaces: 2G Iuh; 3G Iuh; S1-AP/S1-U for 4G; and a SON interface.

HNG 904 includes 2G interworking module 905, 3G interworking module 906, and Iu proxy module 907. 2G interworking module 905 takes Iuh and interworks it to IuCS and IuPS. Similarly, 3G interworking module 906 takes Iuh and interworks it to IuCS and IuPS. Once converted to IuCS or IuPS, IuCS/IuPS proxy 907 acts as a proxy for communications with a 3G core network, which natively supports IuCS/IuPS, over IuCS/IuPS interface 910.

As well, HNG 904 is in communication with a standard 2G or 3G base station, shown as 911 2G BTS/BSC or 3G RNC. This communication is over IuCS/IuPS and not over Iuh; however, IuPS and IuCS are able to be handled by HNG 904 and can be proxied over to the 3G core network via interface 910.

HNG 904 also includes 4G gateway 908 and multi-RAT SON module 909. The 4G gateway simply provides a proxy and gateway for the 4G eNodeB 903 to S1-AP/S1-U interface 911, which connects natively to the 4G EPC. The SON module performs SON functionality as described herein, which generally includes looking at load statistics and changing thresholds; looking at all data being collected, including subscriber information and call state information; analytics; intelligent decisions; and proactive, as well as reactive action. The SON module is connected to all RATs, all proxies, and all core networks, and can use that information to provide multi-RAT SON functionality.

Figure 10:
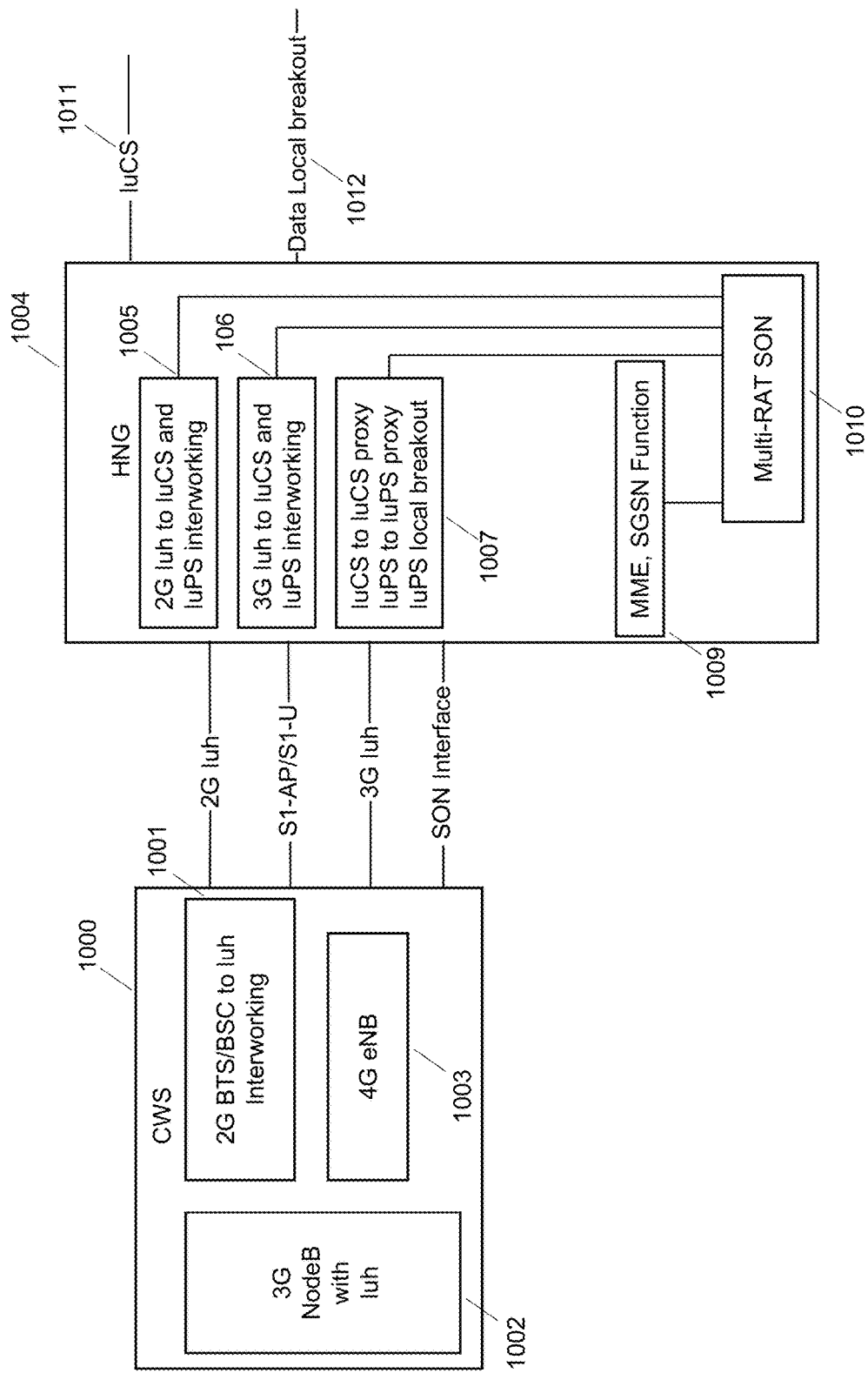
FIG. 10 is a network architecture diagram showing a block diagram of a multi-RAT node and a convergence gateway, the convergence gateway having IuCS and local breakout interfaces toward a core network, in accordance with some embodiments.

FIG. 10 is a network architecture diagram showing a block diagram of a multi-RAT node and a convergence gateway, the convergence gateway having IuCS and local breakout interfaces toward a core network, in accordance with some embodiments. Similar to FIG. 9, multi-RAT CWS 1000 includes 2G BTS/BSC 1001, which has its own built-in Iuh interworking; 3G NodeB with Iuh 1002; and 4G eNodeB 1003. Similar to FIG. 9, 2G Iuh, 3G Iuh, S1, and SON are the four inbound interfaces to HNG 1004. However, HNG 1004 has two outbound interfaces: an IuCS interface 1011, toward a 3G core network, and a data local breakout interface 1012, directly facing the Internet. This architecture is suitable when a network operator is using a public network for backhaul, for instance.

A 2G Iuh-IuCS/IuPS proxy 1005 and a 3G Iuh-IuCS/IuPS proxy 1006 may be provided, as well as an IuCS proxy, an IuPS proxy, and an IuPS local breakout module 1007.

Since IuCS is available, 2G and 3G circuit-switched calls are interworked to IuCS, and they are sent out over IuCS interface 1011. However, since IuPS is not available and S1 is not available, all data connections, including S1-U and IuPS, are interworked to GTP-U tunnels or bare IP packets and are sent out over data local breakout interface 1012.

In some embodiments, an MME and an SGSN function are built into the HNG 1004 to absorb these communications before they are sent to the core network, thereby reducing demand for signaling data. A SON module 1010 is also provided.

Figure 11:
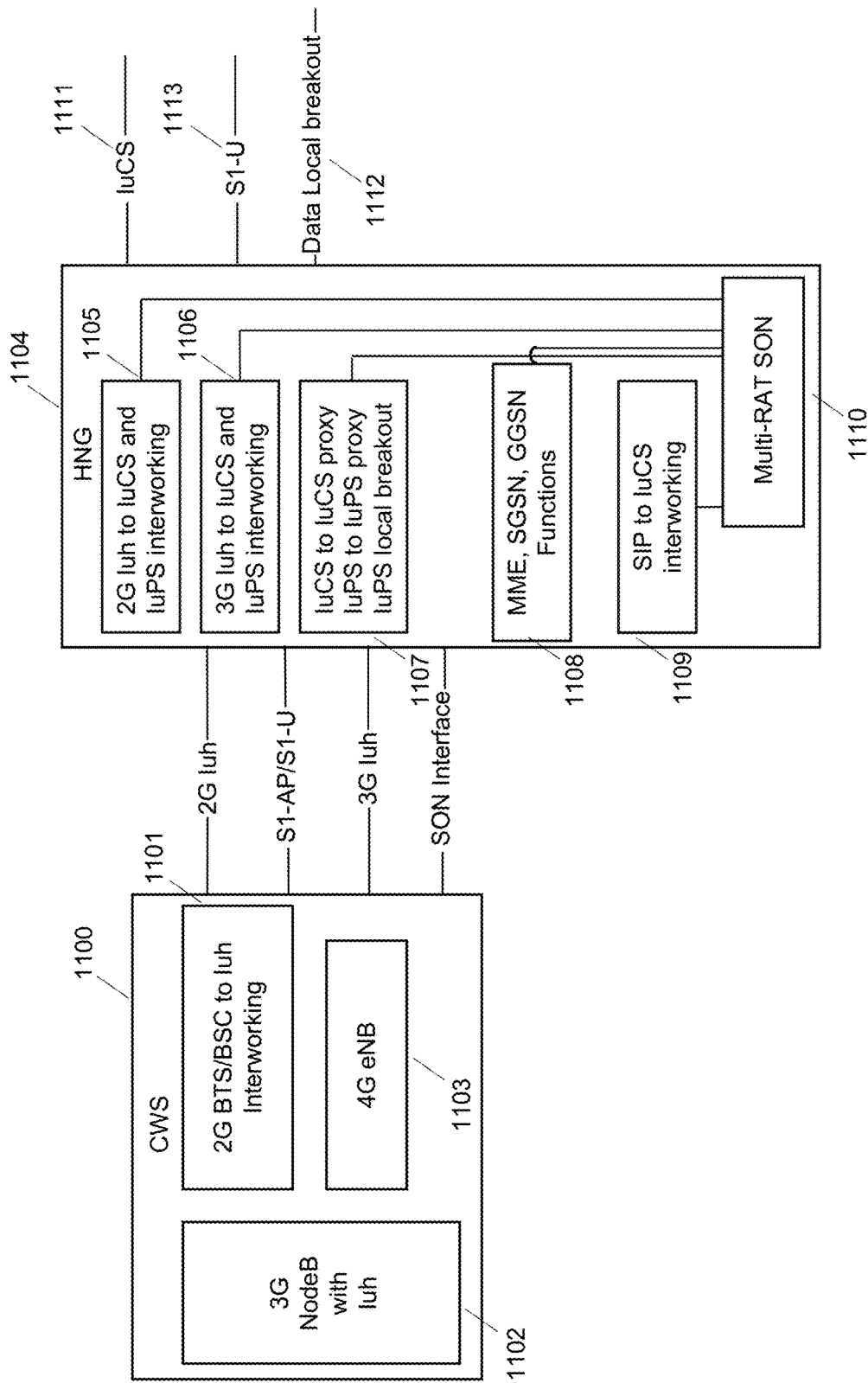
FIG. 11 is a network architecture diagram showing a block diagram of a multi-RAT node and a convergence gateway, the convergence gateway having IuCS, S1, and local breakout interfaces toward a core network, in accordance with some embodiments.

FIG. 11 is a network architecture diagram showing a block diagram of a multi-RAT node and a convergence gateway, the convergence gateway having IuCS, S1, and local breakout interfaces toward a core network, in accordance with some embodiments. Similar to FIG. 9, multi-RAT CWS 1100 includes 2G BTS/BSC 1101, which has its own built-in Iuh interworking; 3G NodeB with Iuh 1102; and 4G eNodeB 1103. Similar to FIG. 9, 2G Iuh, 3G Iuh, S1, and SON are the four inbound interfaces to HNG 1104. However, HNG 1104 has three outbound interfaces: an IuCS interface 1111, toward a 3G core network, an S1-U interface 1113, toward a 4G core network, and a data local breakout interface 1112, directly facing the Internet. This configuration is suitable when backhaul directly to a 4G core network is available.

HNG 1104 also includes, in addition to interworking modules 1105, 1106, 1107 and SON module 1110, additional MME/SGSN/GGSN functions 1108 and SIP to IuCS interworking 1109. SIP interworking enables VOLTE and VOIP to be interworked to 3G and completed over IuCS interface 1111.

FIG. 12 is a network architecture diagram showing a block diagram of a multi-RAT node and a convergence gateway, the convergence gateway having S1 and local breakout interfaces toward a core network, in accordance with some embodiments. CWS 1200 is similar to CWS 1100. Base station 1210 is a 2G BTS/BSC or 3G RNC, and uses either IuCS/IuPS, A over IP/Gb over IP, or both, to connect to HNG 1204. HNG 1204 has two outbound connections: S1 connection 1211 and data local breakout 1212. HNG 1204 does not have a circuit-switched outbound connection; this configuration does not require a 3G core network and uses IMS to complete all calls. As a result, A/IP and IuCS must be interworked to VoLTE using an interworking proxy. This interworking proxy may require transcoding.

Figure 13:
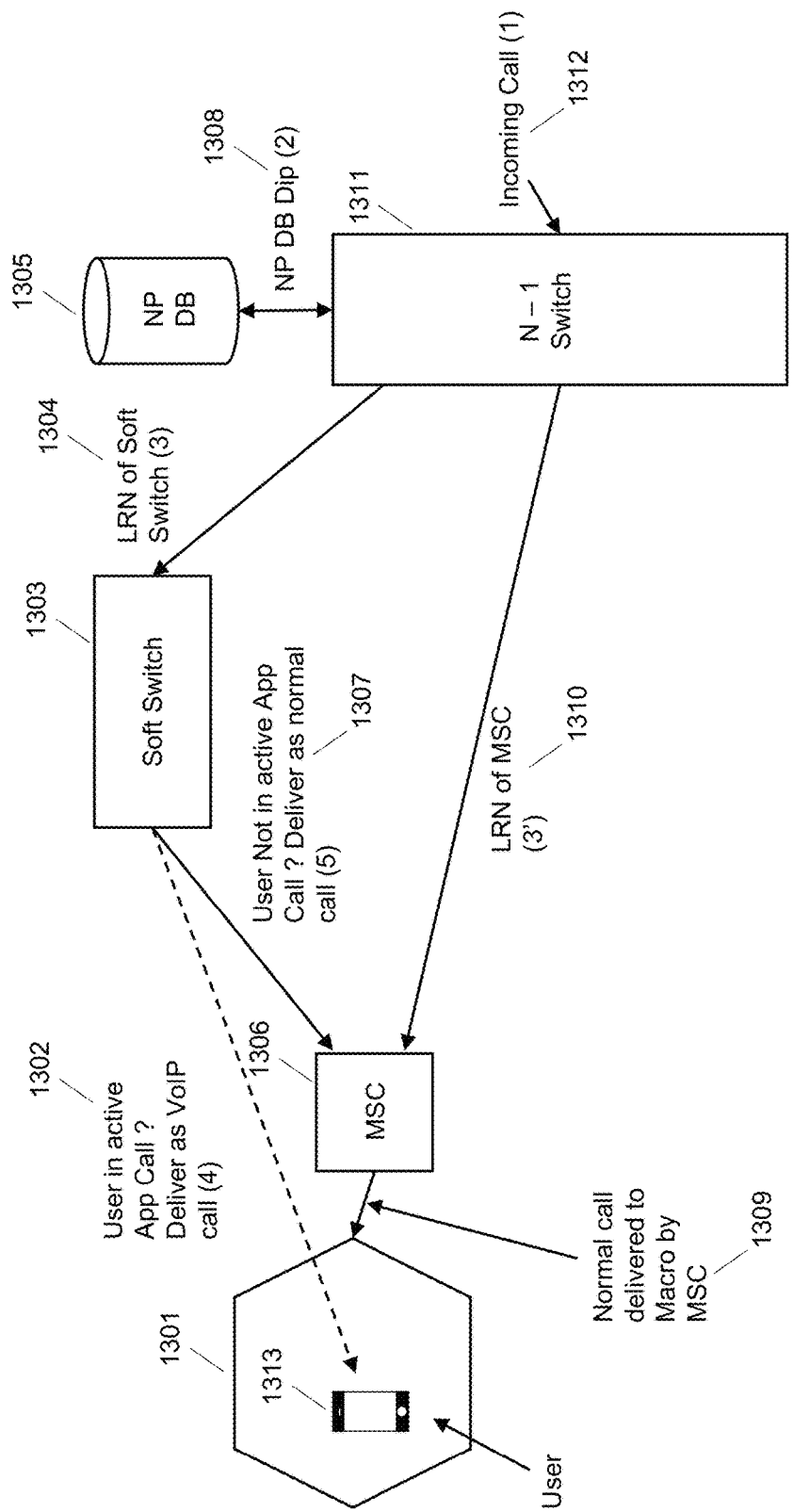
FIG. 13 is a network architecture diagram showing a first delivery of a call using a soft switch, in accordance with some embodiments.

FIG. 13 is a network architecture diagram showing a first delivery of a call using a soft switch, in accordance with some embodiments. In some embodiments, a call for a mobile device 1313 is received 1312 at switch 1311, which may be an N−1 All Call Query switch in a mobile operator network. Switch 1311 may check (1308) with a number portability database 1305 to help determine how to route the call. If the call can be routed via a soft switch 1303, for example because the mobile device 1313 is in an area handled by the soft switch, the call is routed (1304) by switch 1311 to soft switch 1303 using the location routing number of the soft switch. In some embodiments a mobile app call may be routed through switch 1311, for example, a mobile app call placed to a telephone number via SIP. In some embodiments switch 1311 may be configured to permit VoIP calls to be placed directly to it over the Internet. In some embodiments, VoIP over-the-top (e.g., IP) calls may be directed directly to soft switch 1303 without going through switch 1311. Soft switch 1303 may be a next hop soft switch.

In some embodiments, at the soft switch 1303, additional processing is performed to determine, for example, whether the user is in an active app call or in an active native call. This may be done by querying an API at a convergence gateway. The convergence gateway is located at the soft switch, in some embodiments, and is situated between a radio access network and a core network. The convergence gateway may be able to de-encapsulate or look inside tunnels, including secured tunnels, and may use this ability to determine call status, in some embodiments. In other embodiments a simple semaphore or metadata signaling may be used at the convergence gateway when a call is started and stopped either by an app or by the native dialer, allowing this information to be provided via the API to soft switch 1303.

In some embodiments, based on the determination at the soft switch or the convergence gateway, the soft switch may route the call. In the case that the mobile device is in the middle of an app call, the call may be delivered as a VoIP call (1302). In the case that the mobile device is in the middle of a native call (1307), the call may be delivered as a native call (1309) via MSC 1306. This enables VoIP calls to be delivered to the VoIP app, and native calls to be delivered to the native app, and call holding and other call management functions to be performed when the mobile device is in the midst of another call.

In some embodiments, native calls may also be delivered directly from switch 1311 to MSC 1306. In some embodiments the MSC may access the API at soft switch 1303/at the convergence gateway and may route calls back through soft switch 1303 (not shown) to be completed via VoIP.

Figure 14:
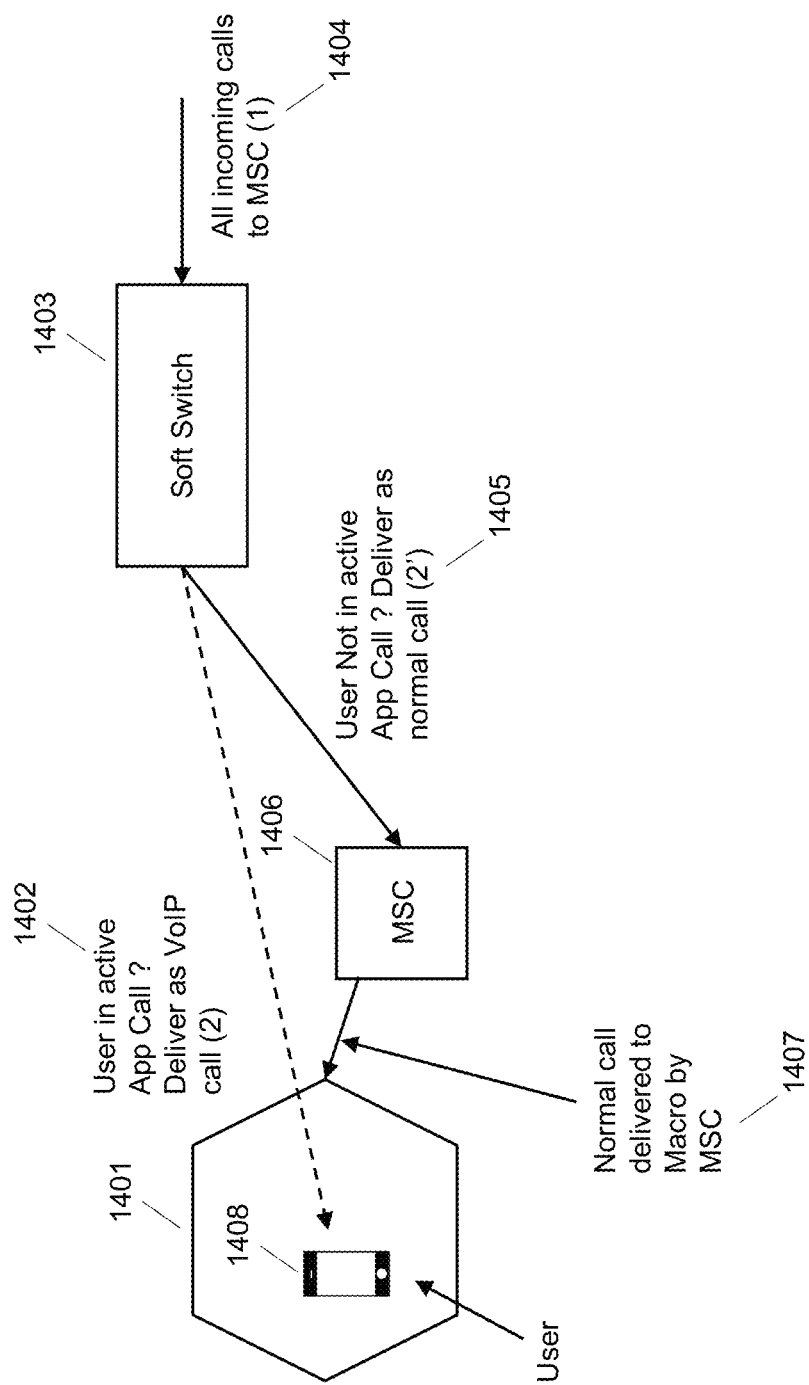
FIG. 14 is a network architecture diagram showing a second delivery of a call using a soft switch, in accordance with some embodiments.

FIG. 14 is a network architecture diagram showing a second delivery of a call using a soft switch, in accordance with some embodiments. This approach assumes a SIP soft switch that handles VoIP app calling, but where all calls before going to MSC are routed via the soft switch (using a numbering plan or routing tables, etc.). The soft switch may, in some embodiments, determine whether the call should be delivered via app or native dialer. Incoming calls for user device 1408 are received at the soft switch 1403, which is also the location of a convergence gateway, in some embodiments, or may be located at a different device from the convergence gateway. In some embodiments all incoming calls are MSC calls (e.g., native calls) (shown as 1404). The soft switch determines whether the user is in an active app call, using an API call to the convergence gateway or using other means as described herein. If the user is not in an active app call (1405), the call may be delivered as a normal call via MSC 1406, which requires no interworking or transcoding. The normal call is then delivered to the macro by the MSC 1407. Alternatively, in some embodiments, if the user is in the middle of a native app call, the call may be delivered as a VoIP call (1402), over a data bearer or other data tunnel; this path would not lead through the MSC. The soft switch 1403 as shown here is able to receive native calls and transcode them as appropriate to VoIP calls and vice versa.

In some embodiments, with reference to at least FIGS. 13-14, the soft switch may optionally invoke SIP call forking, by, for example, calling the VoIP app first followed by an MSC call, or vice versa, or calling a number of devices in succession using different SIP destination addresses, including both VoIP and MSC call endpoints. In some embodiments the soft switch may support multiple apps, including desktop computer apps, and may ring them using call forking. In some embodiments, call waiting, call hold, call merge, call swap, and other functions may be enabled for VoIP calls by muting, merging, transcoding, etc. as necessary at the soft switch. In some embodiments, the call management functions may be performed at the soft switch for a combination of VoIP and native calls, or may be assisted at the soft switch therefor.

In some embodiments, VoIP calls may interact with native calls and vice versa. This may be via a call merge, and may be performed at the soft switch, or the convergence gateway, or at the mobile device. In some embodiments VoWiFi, VoLTE, private/enterprise 3G/LTE deployments, or other types of calls could be handled as a peer to the VoIP and native calls described herein, and could be permitted to also interact and have the benefit of management functions.

In some embodiments, the API described herein could be used to permit an operator or VoIP app provider to provide in-network free calling without the cost or burden of expensive trunks or circuits, or hairpin routing, or international/long distance.

In some embodiments the API described herein may turn on and off any combination of features at the soft switch or convergence gateway. For example, a mobile operator may enforce, using the API, conversion of all calls to native dialer calls or VoIP calls. As another example, a UE can enforce the same type of conversion. As another example, a base station in the network may determine, based on relative load or usage of resources in the radio access network for packet-switched and circuit-switched connections, whether VoIP or native calls would be preferred, and may use this API to cause call termination using PS or CS as most appropriate (for example, terminating calls as CS calls when backhaul data throughput is near capacity).

In some embodiments, the functionality provided at the soft switch and/or the convergence gateway may be controlled on a per-user basis, or on a per-network basis, or based on a variety of other parameters or factors. Profiles and configuration files may be managed locally or remotely.

The soft switch may support RADIUS AAA, REDIRECT & ENUM Server Support, NAT Traversal & Topology Hiding, Media Monitor (Disconnect Call on No Media), Caller-Carrier PTIME isolation, Auto Inband, Outband DTMF over IP, Digit Manipulation & Number Translation, Least Cost & Profit based Routing, LRN & MNP based Routing, Source & Destination based Routing, Prefix & Percentage based Routing, Preferred & Gateway based Routing, Route Capacity [Channels/CPS] Routing, Destination based Rating, Pulse Customization, Date & Time based Rates Upload, CSV and Excel File Support, E,164 and E,212 Format Support, Wholesale Tariff Management, Blocking & Unblocking of Destinations, Hierarchy based Billing, Re-Rating, Individual Credit Limits for every Endpoint, Lower Balance Mail Alert, Billing Cycle with Setup & Rental Fee, Free Calling for a Certain Amount, Free Minutes (Overall or Certain Destinations Only), Special Rates after Free Minutes, Metered usage charges, Percentage or Flat Fee based Surcharges & Taxes, IVR, Web & SMS Interfaces, System connects Destination and Origination Numbers and charges the Subscriber, Caller ID or Name based on Caller, Origination Gateway or Termination Gateway, Caller ID Block, Anonymous Call Block, Call Hold, Music on Hold, Call Waiting, Absent Subscriber & DND, Call Return [Last Number Redial], Call Forward [Every time, Busy, No Answer & Number Not Available], Call Transfer [Attended & Unattended], Find Me-Follow Me, Simultaneous Ring, Call Pickup, Selective Outgoing Call Barring, Selective Incoming Call Block, Speed Dial, 3-Way-Calling (Device Feature), and other functions commonly supported by IP-based soft switches, In some embodiments, the base stations described herein may be compatible with a Long Term Evolution (LTE) radio transmission interface or air interface. The LTE-compatible base stations may be eNodeBs. In addition to supporting the LTE interface, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency interfaces, and may also support transmit power adjustments for some or all of the radio frequency interfaces supported.

In some embodiments, the MSC described herein may be any mobile network node providing call switching, providing functions and having a different name as appropriate for 2G, 3G, 4G, or future technologies. In some embodiments, the MSC may be a multi-RAT-capable MSC and may support more than one technology. In some embodiments, the MSC may be part of the soft switch and may natively handle VoIP call switching.

Although the present disclosure focuses on the use of SIP and RTP to provide over-the-top (OTT) calling functions, other protocols may also be used that operate using a packet-based protocol that is agnostic as to the network used for transport, e.g., VoWiFi, VoLTE, etc.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional interfaces that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A method, comprising:
   receiving, at a switch in a mobile operator network, an incoming call for a mobile device;
   querying a convergence gateway from soft switch via an application programming interface (API) at the convergence gateway to determine a current call state of the mobile device;
   delivering the incoming call via the soft switch over IP as a VoIP call to a VoIP calling software application on the mobile device if the mobile device is not currently engaged on a VoIP call; and
   delivering the incoming call as a second VoIP call via the VoIP calling software application, if the mobile device is currently engaged on a VoIP call.

2. The method of claim 1, further comprising providing call waiting, call hold, call swap, or call joining at the mobile device using the VoIP calling software application.

3. The method of claim 1, further comprising delivering a second incoming call via a mobile operator network as a native call to the mobile device, and providing call waiting, call hold, call swap, or call joining at the mobile device using operator network-assisted native call functions.

4. The method of claim 1, further comprising performing evaluation of the incoming call using a number portability database to determine whether the incoming call is able to be rerouted to a soft switch; and routing the incoming call to the soft switch.

5. The method of claim 1, wherein the convergence gateway is situated in an operator network as a gateway between a plurality of base stations and a network switching subsystem in a 2G, 3G, or 4G LTE network.

6. The method of claim 1, wherein the API is enabled to be accessed by the VoIP calling software application on the mobile device for handling VoIP calls and for determining a current call state of the mobile device.

7. The method of claim 1, wherein the API is enabled to be accessed by an operator core network for handling native calls and for determining a current call state of the mobile device.

8. A non-transitory computer-readable medium comprising instructions which, when executed on a processor at a gateway, cause the gateway to perform steps comprising:
   receiving a request to deliver an incoming call;
   determining whether a mobile device is currently engaged on a Voice over IP (VoIP) call using a VoIP application on the mobile device;
   delivering the incoming call via a mobile switching station in a mobile operator network as a native telephone call to the mobile device, if the mobile device is not currently engaged on a VoIP call;
   delivering the incoming call as a second VoIP call via the VoIP application, if the mobile device is currently engaged on a VoIP call; and
   enabling an application programming interface (API) to be accessed by the VoIP calling software application on the mobile device for handling VoIP calls and for determining a current call state of the mobile device.

9. The non-transitory computer-readable medium of claim 8, the steps further comprising providing call waiting, call hold, call swap, or call joining at the mobile device using the VoIP calling software application.

10. The non-transitory computer-readable medium of claim 8, the steps further comprising delivering a second incoming call via a mobile operator network as a native call to the mobile device, and providing call waiting, call hold, call swap, or call joining at the mobile device using operator network-assisted native call functions.

11. The non-transitory computer-readable medium of claim 8, the steps further comprising performing evaluation of the incoming call using a number portability database to determine whether the incoming call is able to be rerouted to a soft switch; and routing the incoming call to the soft switch.

12. The non-transitory computer-readable medium of claim 8, wherein the gateway is situated in an operator network as a gateway between a plurality of base stations and a network switching subsystem in a 2G, 3G, or 4G LTE network.

13. The non-transitory computer-readable medium of claim 8, the steps further comprising enabling an application programming interface (API) to be accessed by an operator core network for handling native calls and for determining a current call state of the mobile device.

* * * * *